(12) United States Patent  
Yamaguchi

(10) Patent No.: US 9,979,860 B2  
(45) Date of Patent: May 22, 2018

(54) IMAGE FORMING APPARATUS, NON-TRANSITORY COMPUTER-READABLE STORAGE MEDIUM STORING COLOR-CONVERSION CONTROL PROGRAM, AND COLOR-CONVERSION CONTROL METHOD

(71) Applicant: KONICA MINOLTA, INC., Chiyoda-ku, Tokyo (JP)

(72) Inventor: Takeshi Yamaguchi, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 0 days. days.

(21) Appl. No.: 15/482,324

(22) Filed: Apr. 7, 2017

(65) Prior Publication Data

US 2017/0310854 A1 Oct. 26, 2017

(30) Foreign Application Priority Data

Apr. 21, 2016 (JP) .................................. 2016-084899

(51) Int. Cl.
*H04N 1/40* (2006.01)
*H04N 1/60* (2006.01)
*H04N 1/00* (2006.01)

(52) U.S. Cl.
CPC ....... *H04N 1/6019* (2013.01); *H04N 1/00323* (2013.01); *H04N 1/6008* (2013.01); *H04N 1/6044* (2013.01); *H04N 2201/0094* (2013.01)

(58) Field of Classification Search
CPC ............. H04N 1/6019; H04N 1/00323; H04N 1/6008; H04N 1/6044; H04N 2201/0094
See application file for complete search history.

(56) References Cited

U.S. PATENT DOCUMENTS

| 7,505,173 B2 | 3/2009 | Viturro et al. | |
|---|---|---|---|
| 2014/0293300 A1* | 10/2014 | Teraue | H04N 1/6036 358/1.9 |
| 2015/0350493 A1 | 12/2015 | Sakatani | |
| 2015/0365564 A1* | 12/2015 | Imaseki | H04N 1/6019 358/504 |

FOREIGN PATENT DOCUMENTS

| JP | 2006033572 A | 2/2006 |
|---|---|---|
| JP | 2015226128 A | 12/2015 |

* cited by examiner

*Primary Examiner* — Quang N Vo
(74) *Attorney, Agent, or Firm* — Holtz, Holtz & Volek PC

(57) ABSTRACT

An image forming apparatus includes a printing unit, an in-line colorimeter and an in-line scanner. A hardware processor is configured to control the printing unit, the in-line colorimeter and the in-line scanner, to perform the following operations. The hardware processor uses the printing unit to print a first color chart to be measured with the in-line scanner and an external colorimeter, and a second color chart to be measured with the in-line scanner and the in-line colorimeter. A hardware processor creates a scanner profile based on RGB values and colorimetric values of patches of the second size in the second area in the first color chart, and uses RGB values and colorimetric values of patches of the first size in the first area in each of the first and second color charts, to calculates correction amounts for use in estimation of colorimetric values by using the scanner profile.

21 Claims, 13 Drawing Sheets

IMAGE FORMING APPARATUS, NON-TRANSITORY COMPUTER-READABLE STORAGE MEDIUM STORING COLOR-CONVERSION CONTROL PROGRAM, AND COLOR-CONVERSION CONTROL METHOD

The entire disclosure of Japanese Patent Application No. 2016-084899 filed on Apr. 21, 2016 including description, claims, drawings, and abstract are incorporated herein by reference in its entirety.

TECHNICAL FIELD

The present invention is directed to image forming apparatuses, non-transitory computer-readable storage media each storing a color-conversion control program, and color-conversion control methods. In particular, the present invention is directed to an image forming apparatus including an in-line scanner and an in-line colorimeter, a non-transitory computer-readable storage medium storing a color-conversion control program to be used for creating or correcting a scanner profile to estimate colorimetric values, and a color-conversion control method.

BACKGROUND

Devices, such as a scanner and a printer, output device values (like RGB values or CMYK values) which are values depending on the respective devices, or device-dependent values. To handle device values, a color conversion table (a device profile) for converting device values into device-independent colors is created, and the device values are converted into colorimetric values in a device-independent color space by using the device profile. As an example of a way to create a device profile, a description is now given of a way to create a scanner profile. To create a scanner profile, a color chart is output with a printer, and the color chart is measured with a scanner and a colorimeter. RGB values obtained by measurement of the color chart with the scanner and L*a*b* values in the CIE 1976 color space or XYZ values of the CIE 1931 color space obtained by measurement of the color chart with the colorimeter are associated with each other, whereby a scanner profile is created.

In such a scanner file, the correspondence between RGB values and colorimetric values can deteriorate with a change of an individual body or a component of a scanner, or a change of a paper type used for scanning. It can worsen the accuracy of estimation of colorimetric values (in other words, the accuracy of conversion of RGB values into colorimetric values) by using the scanner profile. In order to estimate colorimetric values with accuracy, there is a need to recreate a scanner profile for each scanner and each paper type or to create a correction LUT (look-up table) to be used for correction of the scanner profile.

As an example of a technique to recreate a scanner profile, there is a technique to use a commercial software program and recreate the scanner profile by obtaining a color chart reprinted with a printer and measuring the color chart with both a scanner and a colorimeter. As an example of a technique to correct a scanner profile in response to an occurrence of the fluctuation of scanner characteristics, Japanese Unexamined Patent Publication (JP-A) No. 2006-033572 discloses a technique to reduce a load of an image processing apparatus by causing a high-speed external device to calculate a scanner profile.

With regard to a technique to measure a color chart with both a scanner and a colorimeter, which is not a technique to correct a scanner profile, U.S. Pat. No. 7,505,173 discloses a method of using a printer equipped with a scanner and a spectrocolorimeter to create a tone curves of CMYK colors to be used for correcting colors output by the printer. As another example, JP-A No. 2015-226128, which corresponds to United States Patent Application Publication No. US2015/0350493A1, discloses the following image forming apparatus. The image forming apparatus uses a spectrocolorimeter and a line sensor to measure plural common color patches formed on a same surface of a same sheet, where the spectrocolorimeter is a device that measures only a partial region in a main scanning direction in the original, and the line sensor is a device that measures the entire region of an image formation width in the main scanning direction in the original. On the basis of measurement information given by measurement of the common color patches with both of the spectrocolorimeter and the line sensor, the image forming apparatus estimates, from measurement information obtained with the line sensor, values equivalent to measurement information to be obtained with the spectrocolorimeter.

To correct a scanner profile, the above-described technique using a commercial software program and the technique disclosed in JP-A No. 2006-033572 need a process to recreate the scanner profile from the beginning, and thus need sufficient time to correct the scanner profile. These techniques further need, at each time when a scanner profile is corrected, a process of outputting a color chart for creating a scanner profile, which may waste time and resources in printing color charts.

By using the techniques disclosed in U.S. Pat. No. 7,505,173 and JP-A No. 2015-226128 to establish a system which can measure patches of a color chart with both of an in-line scanner and an in-line colorimeter, a scanner profile can be corrected with RGB values and colorimetric values of the patches. However, those values obtained on creation of a scanner profile and those values obtained on correction of the scanner profile should not be compared simply with each other since the measurement conditions of the patches on creation of the scanner profile are different from the measurement conditions of the patches on correction of the scanner profile.

In concrete terms, on creation of a scanner profile, patches of small size are used in a color chart so that the color chart can provide detailed color information. On correction of a scanner profile, there is a need to use patches of increased size in a color chart so that an in-line colorimeter can obtain colorimetric values efficiently. On comparison between color measurement of a large-sized patch and that of a small-sized patch, they differ in the degree of the influence of reflected light (the level of flare) coming from patches surrounding the patch to be measured. Therefore, even when a correction LUT is created on the basis of measurement of large-sized patches and then is used to correct a scanner profile which was created on the basis of measurement of small-sized patches, such operations would correct a scanner profile inappropriately.

SUMMARY

The present invention is directed to image forming apparatuses, non-transitory computer-readable storage media each storing a color-conversion control program, and color-conversion control methods.

An image forming apparatus reflecting one aspect of the present invention is an image forming apparatus communicably connected with an external colorimeter. The image forming apparatus comprises: a printing unit configured to print a color chart; an in-line colorimeter; an in-line scanner; a storage unit; and a hardware processor. The in-line colorimeter is configured to measure colors in a first area in a color chart to output colorimetric values including L*a*b* values or XYZ values. The in-line scanner is configured to measure colors in the first area and a second area in a color chart to output RGB values, wherein the first area is an area that is measured by the in-line scanner and the in-line colorimeter and the second area is an area that is measured by the in-line scanner and is not measured by the in-line colorimeter. The hardware processor is configured to control the printing unit, the in-line colorimeter and the in-line scanner, to perform the following operations. The operations comprise, first using the printing unit to print a first color chart prepared by arranging patches of first size in the first area and arranging patches of second size in the second area in the first color chart, where the second size is smaller than the first size. The operation further comprise, first obtaining RGB values of all the patches in the first color chart from the in-line scanner and colorimetric values of all the patches in the first color chart from the external colorimeter. The operation further comprise, creating a scanner profile by associating the RGB values and the respective colorimetric values of the patches in the second area in the first color chart, and storing, in the storage unit, the RGB values and the colorimetric values of the patches in the first area in the first color chart. The operation further comprise, second using the printing unit to print a second color chart prepared by arranging at least patches of the first size in the first area in the second color chart, and second obtaining RGB values of the patches in the first area in the second color chart from the in-line scanner and colorimetric values of the patches in the first area in the second color chart from the in-line colorimeter. The operation further comprise, calculating correction amounts of colorimetric values, for use in estimation of colorimetric values by using the scanner profile, on the basis of the RGB values and the colorimetric values, stored in the storage unit, of the patches in the first area in the first color chart, and of the RGB values and the colorimetric values of the patches in the first area in the second color chart.

A non-transitory computer-readable storage medium reflecting one aspect of the present invention stores a color-conversion control program. The color-conversion control program comprises instructions which, when executed by a computing device or hardware processor, cause the computing device or hardware processor to perform operations. The computing device or hardware processor is communicably connected with an external colorimeter and a storage unit and is configured to control a printing unit configured to print a color chart, an in-line colorimeter and an in-line scanner. The in-line colorimeter is configured to measure colors in a first area in a color chart to output colorimetric values including L*a*b* values or XYZ values. The in-line scanner is configured to measure colors in the first area and a second area in a color chart to output RGB values, wherein the first area is an area that is measured by the in-line scanner and the in-line colorimeter, and the second area is an area that is measured by the in-line scanner and is not measured by the in-line colorimeter. The operations comprise: first using the printing unit to print a first color chart prepared by arranging patches of first size in the first area and arranging patches of second size in the second area, where the second size is smaller than the first size in the first color chart; and first obtaining RGB values of all the patches in the first color chart from the in-line scanner and colorimetric values of all the patches in the first color chart from the external colorimeter. The operation further comprise, creating a scanner profile by associating the RGB values and the respective colorimetric values of the patches in the second area in the first color chart, and storing, in the storage unit, the RGB values and the colorimetric values of the patches in the first area in the first color chart. The operation further comprise, second using the printing unit to print a second color chart prepared by arranging at least patches of the first size in the first area in the second color chart; and second obtaining RGB values of the patches in the first area in the second color chart from the in-line scanner and colorimetric values of the patches in the first area in the second color chart from the in-line colorimeter. The operation further comprise, calculating correction amounts of colorimetric values, for use in estimation of colorimetric values by using the scanner profile, on the basis of the RGB values and the colorimetric values, stored in the storage unit, of the patches in the first area in the first color chart, and of the RGB values and the colorimetric values of the patches in the first area in the second color chart.

A color-conversion control method reflecting one aspect of the present invention is a method for use in a printing system including an image forming apparatus, a storage unit, an external colorimeter and a hardware processor. The image forming apparatus is equipped with a printing unit configured to print a color chart, an in-line colorimeter and an in-line scanner. The in-line colorimeter is configured to measure colors in a first area in a color chart to output colorimetric values including L*a*b* values or XYZ values. The in-line scanner is configured to measure colors in the first area and a second area in a color chart to output RGB values, wherein the first area is an area that is measured by the in-line scanner and the in-line colorimeter and the second area is an area that is measured by the in-line scanner and is not measured by the in-line colorimeter. The hardware processor is configured to control the printing unit, the in-line colorimeter and the in-line scanner. The method comprises: first using, by the hardware processor, the printing unit to print a first color chart prepared by arranging patches of first size in the first area and arranging patches of second size in the second area in the first color chart, where the second size is smaller than the first size; and first obtaining, by the hardware processor, RGB values of all the patches in the first color chart from the in-line scanner and colorimetric values of all the patches in the first color chart from the external colorimeter. The method further comprises creating, by the hardware processor, a scanner profile by associating the RGB values and the respective colorimetric values of the patches in the second area in the first color chart; and storing, by the hardware processor, in the storage unit, the RGB values and the colorimetric values of the patches in the first area in the first color chart. The method further comprises second using, by the hardware processor, the printing unit to print a second color chart prepared by arranging at least patches of the first size in the first area in the second color chart; and second obtaining, by the hardware processor, RGB values of the patches in the first area in the second color chart from the in-line scanner and colorimetric values of the patches in the first area in the second color chart from the in-line colorimeter. The method further comprises calculating, by the hardware processor, correction amounts of colorimetric values, for use in estimation of colorimetric values by using the scanner profile, on the basis of the RGB values and the colorimetric values, stored in the storage unit, of the patches in the first area in the first color chart, and of the RGB values and the colorimetric values of the patches in the first area in the second color chart.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1A:
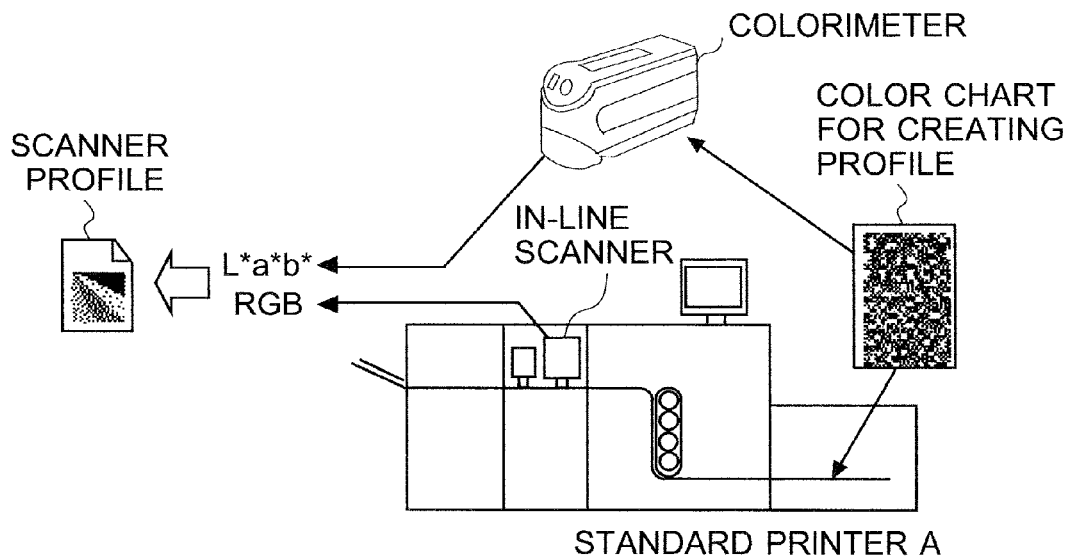
FIGS. 1A and 1B are schematic diagrams tier illustrating an example of a conventional method of estimating colorimetric values.

Hereinafter, embodiments of the present invention will be described with reference to the drawings. However, the scope of the invention is not limited to the illustrated examples.

Image forming apparatuses, non-transitory computer-readable storage media each storing a color-conversion control program, and color-conversion control methods as embodiments of the present invention allow creation or correction of a scanner profile to carry out appropriate estimation of colorimetric values.

That is because an image forming apparatus or a computing device for controlling the image forming apparatus is configured to (when executing a color-conversion control program) to perform the following operations to calculate correction amounts of colorimetric values for use in estimation of colorimetric values from RGB values by using a scanner profile. That is, a hardware processor of the image forming apparatus or computing device uses a printing unit of the image forming apparatus to print a first color chart prepared by arranging patches of first size in a first area and patches of second size, which is smaller than the first size, in the second area in the first color chart. The first area is an area that is measured by the in-line scanner and the in-line colorimeter and the second area is an area that is measured by the in-line scanner and is not measured by the in-line colorimeter. The hardware processor then obtains RGB values of all the patches in the first color chart from the in-line scanner and colorimetric values of all the patches in the first color chart from the external colorimeter. The hardware processor creates a scanner profile by using the RGB values and respective colorimetric values of the patches in the second area in the first color chart, and stores, in a storage unit, the RGB values and colorimetric values of the patches in the first area in the first color chart.

After that, the hardware processor uses the printing unit to print a second color chart prepared by arranging patches of the first size in the first area (and optionally by arranging patches of the second size in the second area) in the second color chart. The hardware processor obtains RGB values of the patches in the first area in the second color chart from the in-line scanner and colorimetric values of the patches in the first area in the second color chart from the in-line colorimeter. On the basis of the RGB values and colorimetric values, stored in the storage unit, of the patches in the first area in the first color chart, and the RGB values and colorimetric values of the patches in the first area in the second color chart, the hardware processor calculates correction amounts of colorimetric values, for use in estimation of colorimetric values by using the scanner profile.

In concrete terms, the hardware processor carries out conversion of the RGB values of the patches in the first area in the second color chart into corresponding colorimetric values, on the basis of the correspondence between the RGB values and colorimetric values, stored in the storage unit, of the patches in the first area in the first color chart. The hardware processor then calculates the correction amounts on the basis of differences between the colorimetric values of the patches in the first area in the second color chart and the respective colorimetric values obtained by the conversion. The hardware processor may create a correction LUT by using the correction amounts. By calculating the correction amounts, the hardware processor can, for example, correct the scanner profile by using the correction amounts, and use the corrected scanner profile to carry out conversion of RGB values of the patches in the second area in the second color chart into corresponding colorimetric values, to estimate colorimetric values corresponding to the RGB values used in the conversion. Alternatively, the hardware processor can use the scanner profile to carry out conversion of the RGB values of the patches in the second area in the second color chart into corresponding colorimetric values, and correct the colorimetric values given by the conversion, by using the correction amounts, to estimate colorimetric values corresponding to the RGB values used in the conversion.

As described in BACKGROUND, a change of an individual body or a component of a scanner, or a change of a type of paper to be used for scanning can affect a correspondence between RGB values and color measurement values held in a scanner profile, and such a change needs a process of recreating a scanner profile for each scanner and each paper type. However, the process of recreating a scanner profile from the beginning needs wastefulness of time and resources. A scanner profile can be corrected by measurement of a color chart with an in-line scanner and an in-line colorimeter. However, this technique can correct the scanner profile inappropriately and increase error in estimated colorimetric values, since the degree of the influence of reflected light (the level of flare) from the patches surrounding a patch to be measured depends on a difference in a patch size of a color chart between at the time of creating a scanner profile and at the time of correcting the scanner profile.

In view of that, an image forming apparatus or a computing device for controlling the image forming device as an embodiment of the present invention, is configured to perform the following operations. That is, a hardware processor of the image forming apparatus or computing device uses a printing unit of the image forming apparatus to print a first color chart. The first color chart is prepared by arranging patches of a first size (for example, a size equal to or larger than that of the minimum area the in-line colorimeter can measure) in a first area in the first color chart, and arranging patches of a second size, which is smaller than the first size, (for example, the line-sensor size the in-line scanner can measure) in the second area in the first color chart. The first area is an area that is measured by the in-line scanner and the in-line colorimeter, and the second area is an area that is measured by the in-line scanner and is not measured by the in-line colorimeter. On creating a scanner profile, the hardware processor obtains RGB values of all the patches in the first color chart from the in-line scanner and colorimetric values of all the patches in the first color chart from the external colorimeter. The hardware processor then creates a scanner profile by associating the RGB values and the respective colorimetric values of the patches in the second area in the first color chart, and stores, in a storage unit, the RGB values and colorimetric values of the patches in the first area in the first color chart.

After that, the hardware processor uses the printing unit to print a second color chart prepared by arranging at least patches of the first size in the first area in the second color chart. Herein, the hardware processor may further arrange patches of the second size in the second area in the second color chart. The hardware processor then obtains RGB values of the patches in the first area in the second color chart from the in-line scanner and colorimetric values of the patches in the first area in the second color chart from the in-line colorimeter. On the basis of the RGB values and colorimetric values, stored in the storage unit, of the patches in the first area in the first color chart, and the RGB values and colorimetric values of the patches in the first area in the second color chart, the hardware processor calculates correction amounts of colorimetric values, for use in estimation of colorimetric values by using the scanner profile.

In concrete terms, the hardware processor may carry out conversion of the RGB values of the patches in the first area in the second color chart into corresponding colorimetric values, on the basis of the RGB values and colorimetric values, stored in the storage unit, of the patches in the first area in the first color chart. Then, the hardware processor may calculate the correction amounts on the basis of differences between the colorimetric values of the patches in the first area in the second color chart and the respective colorimetric values obtained by the conversion. After calculating the correction amounts, the hardware processor may obtain RGB values of the patches in the second area in the second color chart from the in-line scanner, correct the scanner profile by using the correction amounts, and use the corrected scanner profile to carry out conversion of the RGB values of the patches in the second area in the second color chart into corresponding colorimetric values, thereby estimating colorimetric values corresponding to the RGB values (that is, corresponding to the RGB values of the patches in the second area in the second color chart). Alternatively, the hardware processor may obtain RGB values of the patches in the second area in the second color chart from the in-line scanner, use the scanner profile to carry out conversion of the RGB values of the patches in the second area in the second color chart into corresponding colorimetric values, and correct the colorimetric values given by the conversion by using the correction amounts, thereby estimating colorimetric values corresponding to the RGB values (that is, corresponding to the RGB values of the patches in the second area in the second color chart).

Herein, a description is given of concrete examples of a conventional method of estimating colorimetric values and a concrete example of a method of estimating colorimetric values according to an embodiment of the present invention, with reference to FIGS. 1A to 3C. Though estimation of colorimetric values is carried out by using standard printer A and evaluation printer B as printers in the examples shown in FIGS. 1A to 3C, the estimation can be carried out by using the one and same image forming apparatus in place of the printers.

Figure 1B:
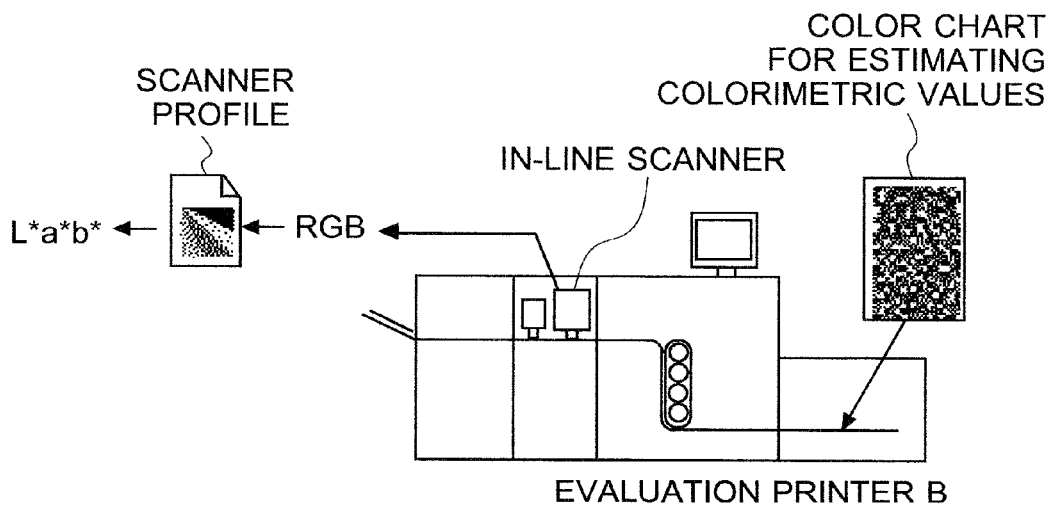

FIGS. 1A and 1B illustrate an example of a conventional method of estimating colorimetric values. First, as shown in FIG. 1A, a color chart for creating a profile is printed with a predetermined printer (here, standard printer A) on a sheet of a certain paper type (here, paper type 1). Successively, each patch in the color chart is measured with both an in-line scanner and an external colorimeter so as to obtain RGB values and colorimetric values (here, L*a*b* values), and a scanner profile in which the RGB values are associated with the colorimetric values for each patch is created. Next, as shown in FIG. 1B, a color chart for estimating colorimetric values is printed with a printer (here, evaluation printer B) on a sheet of another paper type (here, paper type 2). Successively, each patch in the color chart is measured with an in-line scanner so as to obtain RGB values, and the RGB values are converted into colorimetric values (L*a*b* values) by using the scanner profile created in the above operation. In this method, as described in the above, an individual difference in scanners and a difference in paper types can deteriorate the correspondence between RGB values and colorimetric values in the scanner profile. Accordingly, the estimation accuracy of colorimetric values may become worse. Therefore, this method needs a process to recreate a scanner profile for each individual of scanners and each of paper types, which can make wastefulness of time and resources.

Figure 2A:
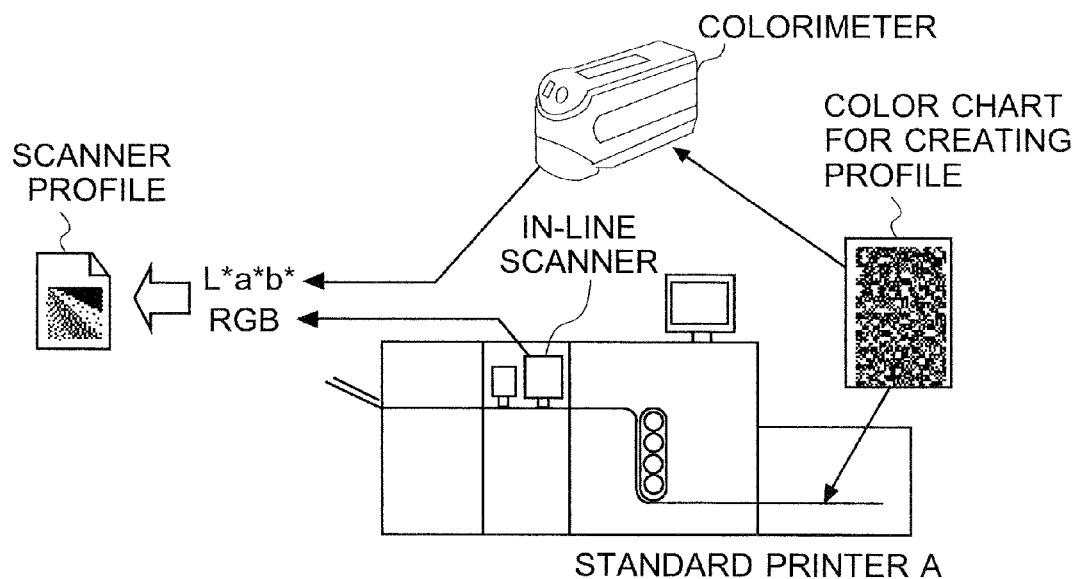
FIGS. 2A and 2B are schematic diagrams for illustrating another example of a conventional method of estimating colorimetric values.
Figure 2B:
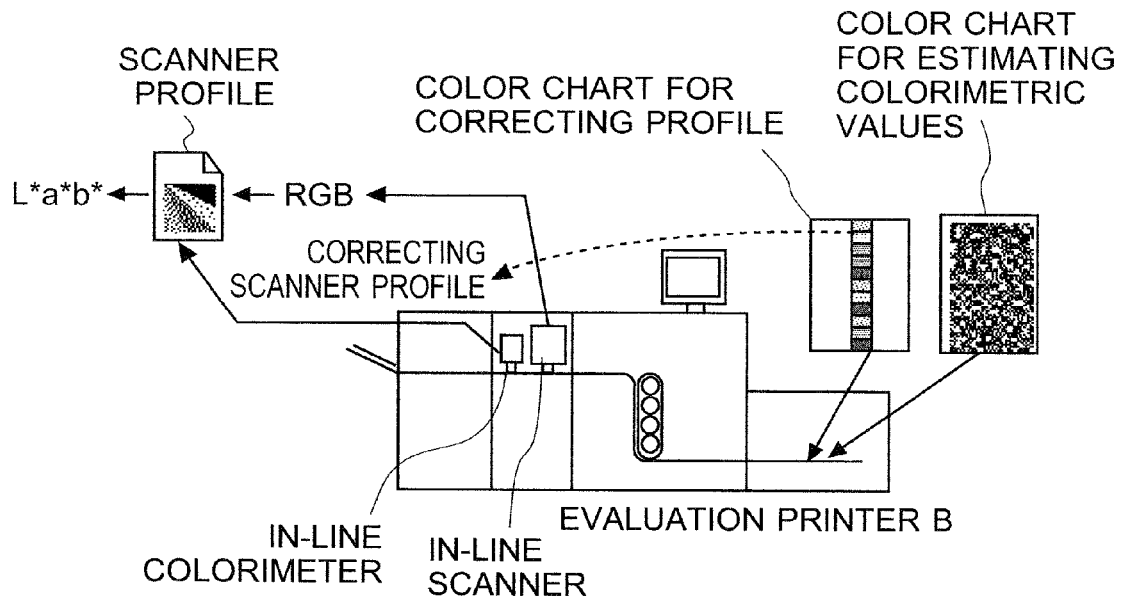

FIGS. 2A and 23 illustrate another example of a conventional method of estimating colorimetric values. First, as shown in FIG. 2A, similarly to the above case, a color chart for creating a profile is printed with a predetermined printer (here, standard printer A) on a sheet of a certain paper type (here, paper type 1). Successively, each patch in the color chart is measured with both an in-line scanner and an external colorimeter so as to obtain RGB values and colorimetric values (here, L*a*b* values), and a scanner profile in which the RGB values are associated with the colorimetric values for each patch is created. Next, as shown in FIG. 2B, a color chart for correcting a profile is printed with a printer (here, evaluation printer B) on a sheet of another paper type (here, paper type 2). Successively, each patch in the color chart is measured with both an in-line scanner and an in-line colorimeter so as to obtain RGB values and colorimetric values, whereby a correction LUT is created. Furthermore, the correction LUT is applied to the scanner profile created in the above operation, whereby the scanner profile is corrected. Then, a color chart for estimating colorimetric values is printed with the evaluation printer B on a sheet of the paper type 2, each patch in the color chart is measured with an in-line scanner so as to obtain RGB values, and the RGB values are converted into colorimetric values (L*a*b* values) by using the corrected scanner profile. In this method, deterioration of the correspondence between RGB values and colorimetric values in the scanner profile, which originates from an individual difference in scanners and a difference in paper types, is corrected with the correction LUT. Accordingly, the estimation accuracy of colorimetric values may become better than the estimation shown in FIGS. 1A and 1B. However, the difference in patch size between a color chart for creating a profile and a color chart for correcting a profile, makes a difference of the flare level in color measurement of the patches between the two types of color chart, and further makes a difference of RGB values obtained by color measurement of the patches with the in-line scanner, between the color charts. It results in insufficient estimation accuracy of colorimetric values.

Figure 3A:
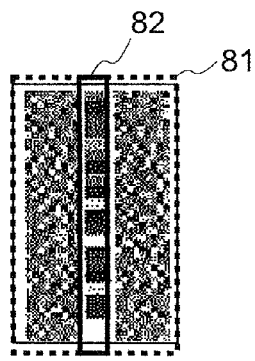
FIGS. 3A, 3B and 3C are schematic diagrams for illustrating an example of a method of estimating colorimetric values, according to one embodiment of the present invention.
Figure 3B:
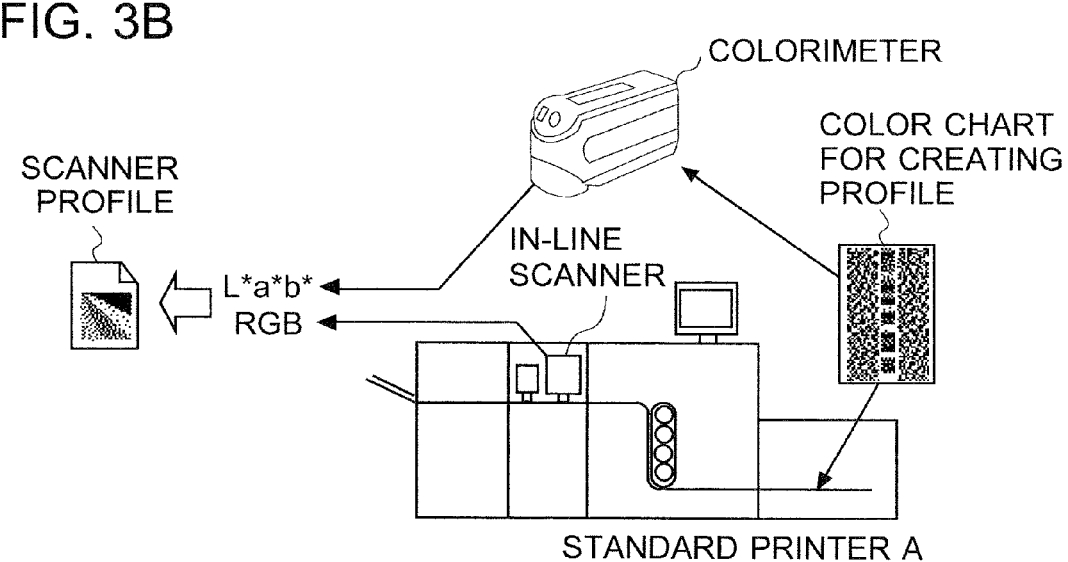
Figure 3C:
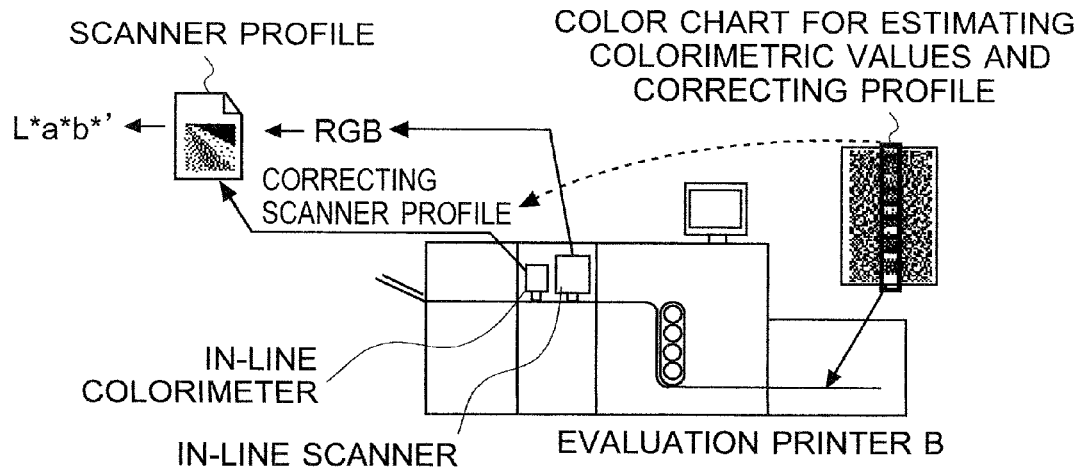

FIGS. 3A to 3C illustrate an example of a method of estimating colorimetric values according to one embodiment of the present invention. In the present embodiment, as shown in FIG. 3A, creation of a scanner profile is carried out by using a color chart in which patches of different sizes are arranged in consideration of measurement area 81 of an in-line scanner and measurement area 82 of an in-line colorimeter. In concrete terms, the color chart is prepared by arranging patches of a first size in a common measuring area (the same area as the measurement area of the colorimeter, and referred to as a first area) that is measured with both the in-line scanner and the in-line colorimeter, and arranging patches of a second size, which is smaller than the first size, in a scanner measuring area (an area excluding the measurement area of the colorimeter from the measurement area of the scanner, and referred to as a second area) that is not measured with the in-line colorimeter and is measured with the in-line scanner. Then, as shown in FIG. 3B, a color chart for creating a profile is printed with a predetermined printer (here, standard printer A) on a sheet of a certain paper type (here, paper type 1). Successively, each patch in the color chart is measured with both an in-line scanner and an external colorimeter so as to obtain RGB values and colorimetric values (here, L*a*b* values), and a scanner profile in which the RGB values are associated with the colorimetric values for each patch in the second area in the color chart, is created. On the creation of the scanner profile, RGB values and colorimetric values of patches in the first area are stored in a storage unit. Next, as shown in FIG. 3C, a color chart for estimating colorimetric values and also for correcting a profile is printed with a printer (here, evaluation printer B) on a sheet of another paper type (here, paper type 2). In the color chart, at least patches of the first size are arranged in the first area, and patches of the second size are optionally arranged in the second area, where the colors and the order of the colors of the patches in the first area are preferably the same as those in the color chart for creating a profile. Successively, patches in the first area in the color chart are measured with both an in-line scanner and an in-line colorimeter so as to obtain RGB values and colorimetric values (here, L*a*b* values). On the basis of the RGB values and the colorimetric values, which were stored in the storage unit, of the patches arranged in the first area in the color chart tier creating a profile, and the RGB values and the colorimetric values of the patches arranged in the first area in the color chart for estimating colorimetric values and also for correcting a profile, correction amounts of colorimetric values, for use in estimation of colorimetric values by using the scanner profile, are calculated.

In concrete terms, on the basis of the RGB values and the colorimetric values, stored in the above operation, of the patches in the first area in the color chart for creating a profile, RGB values of patches in the first area in the color chart for estimating colorimetric values and also for correcting a profile, are converted into corresponding colorimetric values. On the basis of differences between the colorimetric values of the patches in the first area in the color chart for estimating colorimetric values and also for correcting a profile and the respective colorimetric values obtained by the conversion, the correction amounts of colorimetric values can be obtained. After the calculation of the correction amounts, RGB values of the patches in the second area in the color chart for estimating colorimetric values and also for correcting a profile are obtained from the in-line scanner, and the scanner profile is corrected by using the correction amounts (or a correction LUT created from the correction amounts). By using the corrected scanner profile, the RGB values of the patches in the second area in the color chart for estimating colorimetric values and also for correcting a profile, are converted into corresponding colorimetric values, thereby, colorimetric values (L*a*b*' in FIG. 3C) corresponding to the RGB values can be estimated. Alternatively, RGB values of the patches in the second area in the color chart for estimating colorimetric values and also for correcting a profile are obtained from the in-line scanner, and by using the scanner profile, the RGB values of the patches in the second area in the color chart for estimating colorimetric values and also for correcting a profile, are converted into corresponding colorimetric values. Then, by correcting the colorimetric values given by the conversion, by using the correction amounts, colorimetric values (L*a*b*' in FIG. 3C) corresponding to the RGB values can be estimated.

In this method, color measurement of patches of the same size is carried out on both creation of a scanner profile and correction of the scanner profile. Accordingly, color measurement of a patch can be carried out without an influence of reflected light from patches neighboring the patch to be measured or with the same degree of the influence of reflected light (in other words, the same degree of flare level), whereby colorimetric values can be estimated with accuracy.

Herein, in this specification, a profile means a color conversion table. Among various profiles, ICC (international Color Consortium) profiles have been widely used not only in the printing industry but also in the IT industry, and serve as a de facto standard substantially. In an ICC profile, input values in a correspondence table are defined on the basis of the lattice number. In an example that each of R, G and B values is represented by a value in the range from 0 to 255 and the lattice number is set to six, the intervals of the input values are defined by dividing 255 by 5 (the lattice number minus one). Accordingly, each of the RGB values has any one of values of 0, 51, 102, 153, 204, and 255, and the conversion table includes $6^3$ (the cube of six) sets of input RGB values and corresponding sets of colorimetric values.

EXAMPLES

Figure 4:
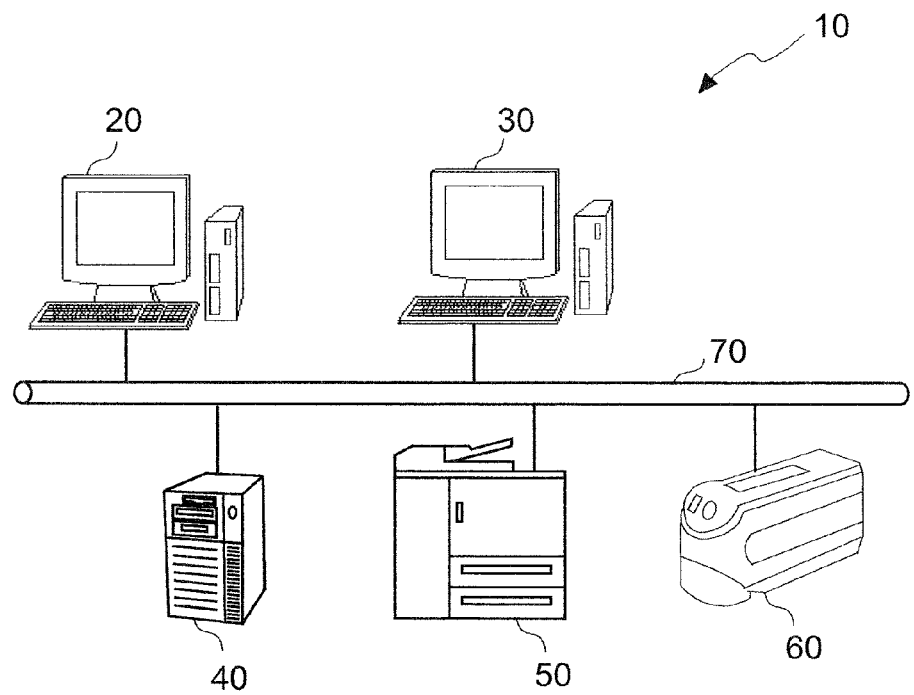
FIG. 4 is a schematic diagram illustrating an example of a printing system according to one embodiment of the present invention.
Figure 5:
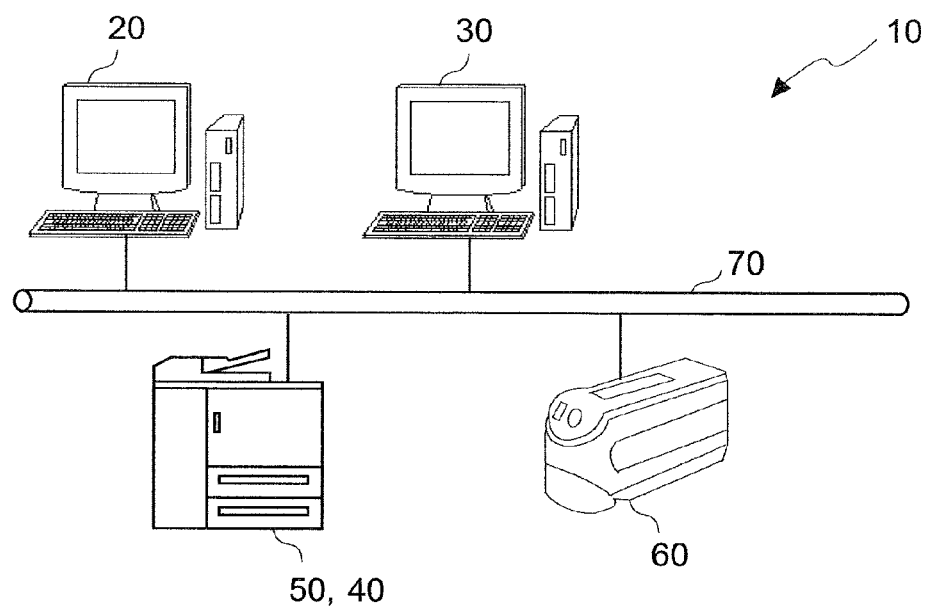
FIG. 5 is a schematic diagram illustrating another example of a printing system according to one embodiment of the present invention.
Figure 6A:
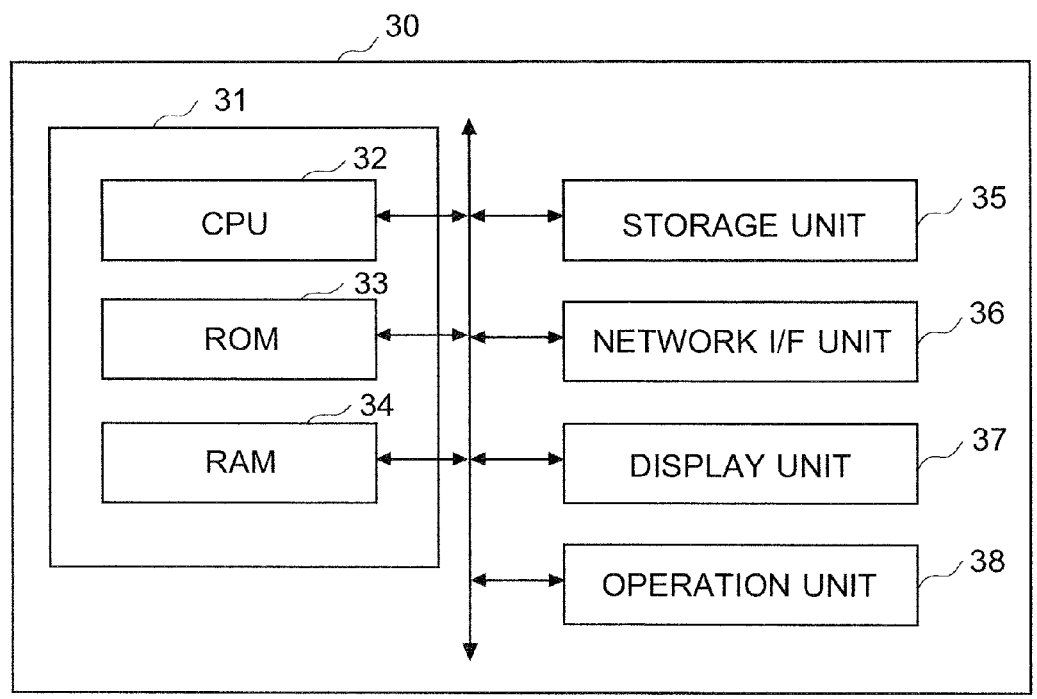
FIGS. 6A and 6B are block diagrams illustrating a constitution example of a profile creation device according to one embodiment of the present invention.
Figure 6B:
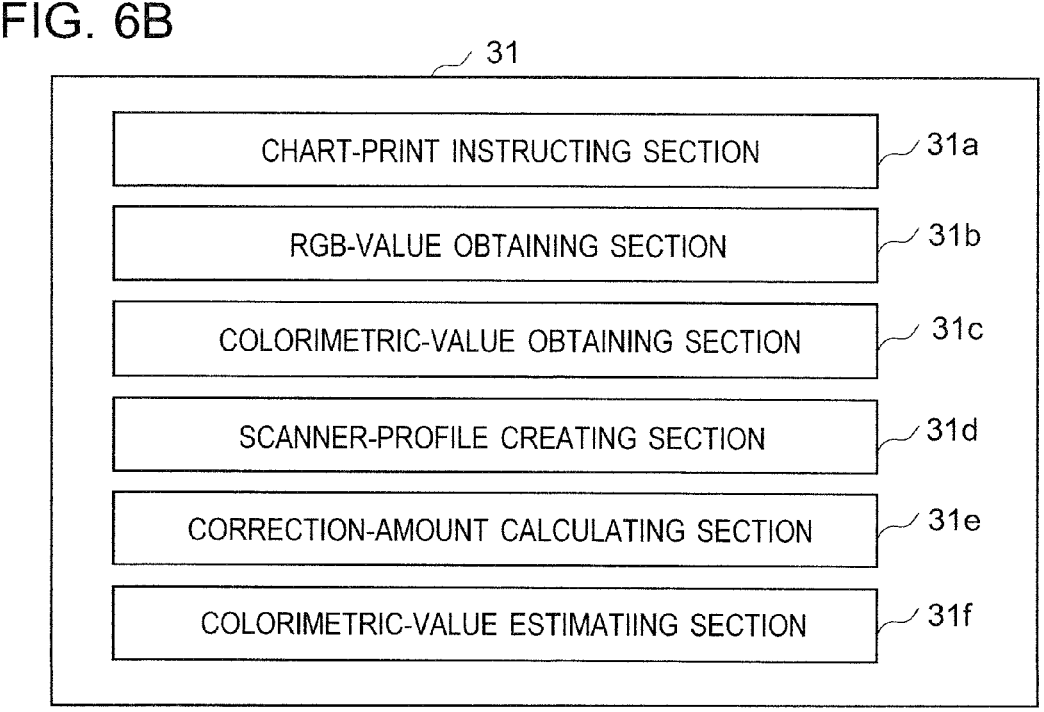
Figure 7:
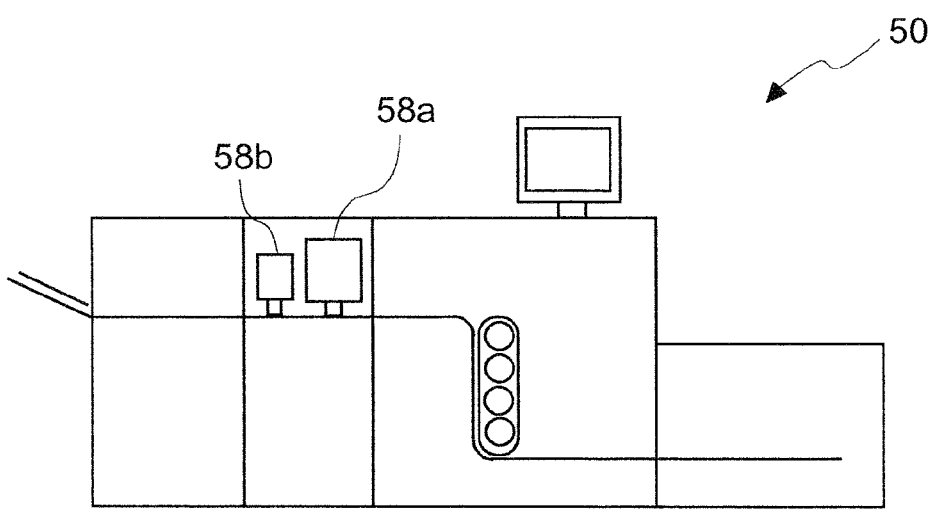
FIG. 7 is a schematic diagram illustrating a constitution example of an image forming apparatus (in a case of including an in-line scanner and an in-line colorimeter) according to one embodiment of the present invention.
Figure 8A:
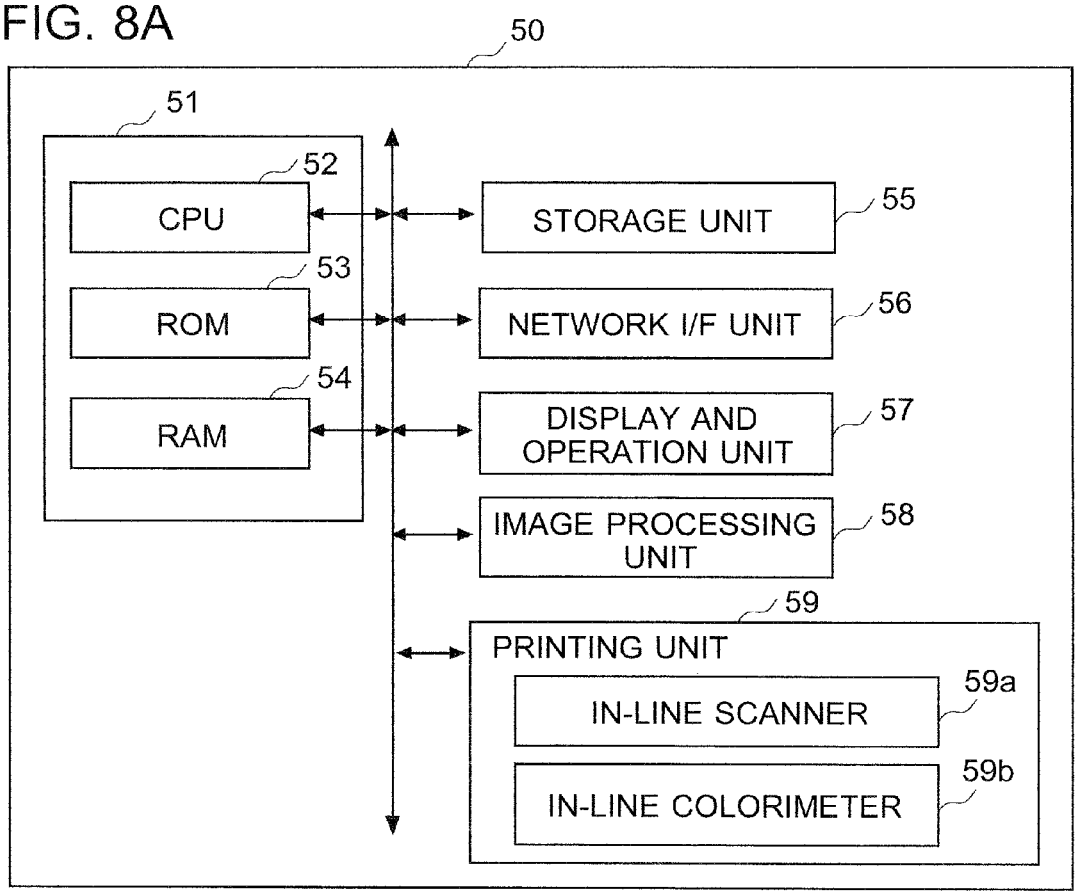
FIGS. 8A and 8B are block diagrams illustrating a constitution example of the image forming apparatus (in a case of including an in-line scanner and an in-line colorimeter) according to one embodiment of the present invention.
Figure 8B:
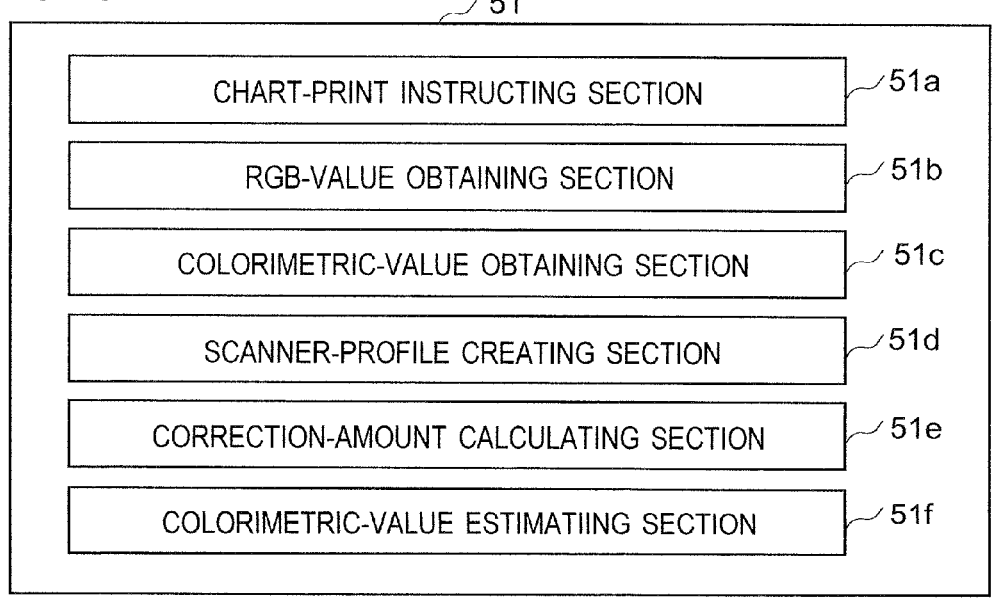
Figure 9:
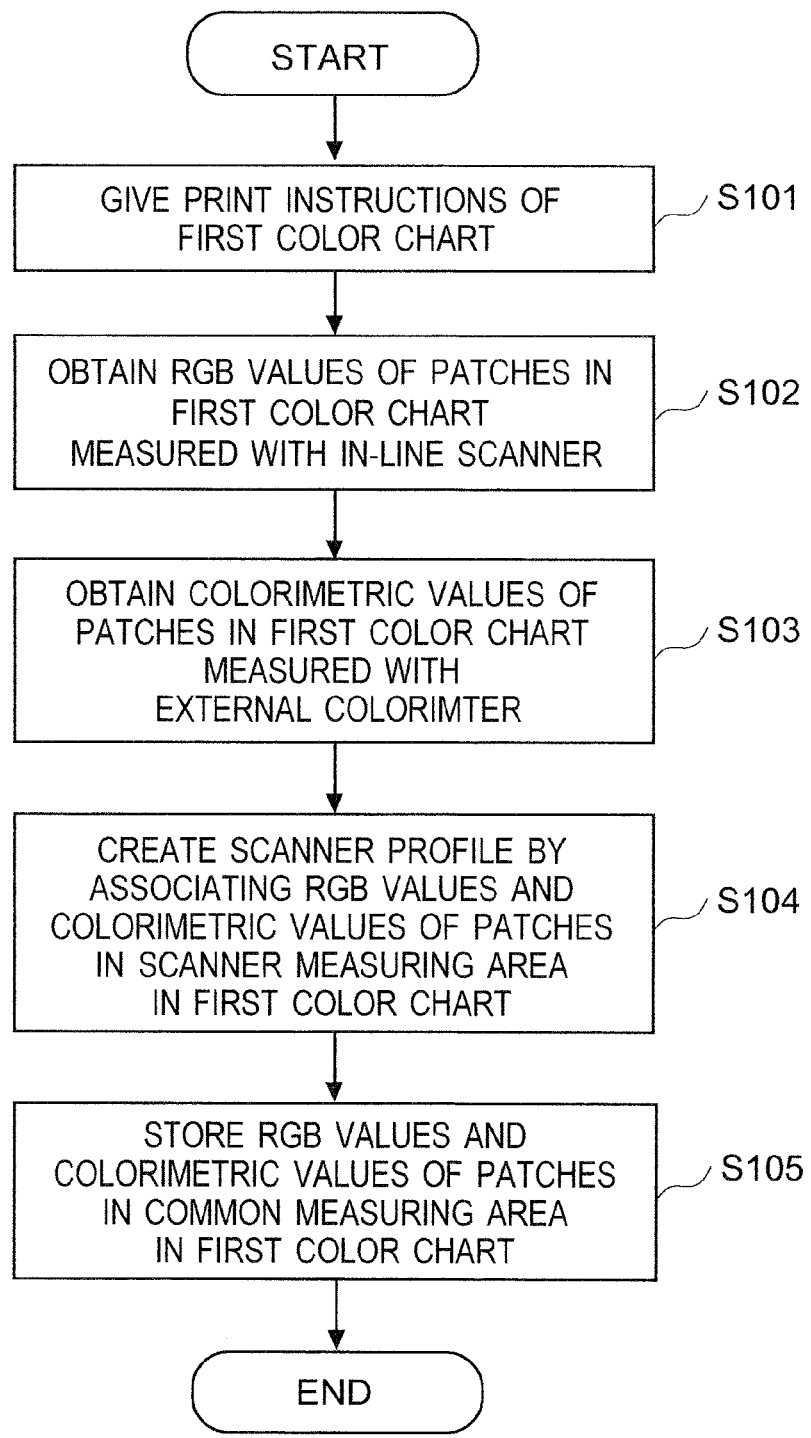
FIG. 9 is a flowchart illustrating an example of operations (creation of a scanner profile) of the image forming apparatus according to one embodiment of the present invention.
Figure 14:
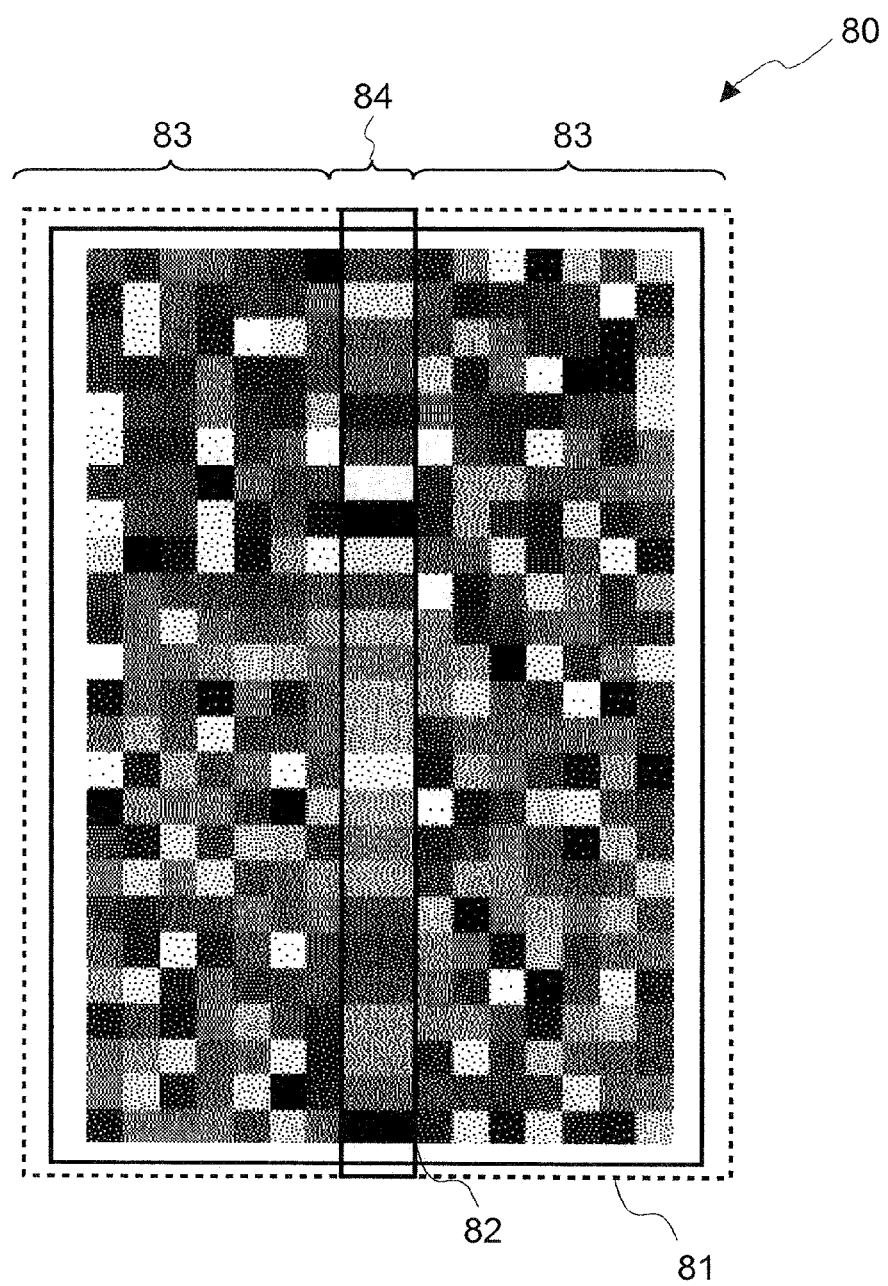
FIG. 14 is a schematic diagram illustrating an example of a color chart according to one embodiment of the present invention.

In order to describe the above-mentioned embodiments of the present invention in more detail, with reference to FIG. 4 to FIG. 14, a description will be given to an example of an image forming apparatus, a non-transitory computer-readable storage medium storing a color-conversion control program and a color-conversion control method. Each of FIG. 4 and FIG. 5 is a schematic diagram illustrating a constitution example of a printing system according to the present example. FIGS. 6A and 6B are block diagrams illustrating a constitution example of a profile creation device according to the present example. FIG. 7 and FIGS. 8A and 8B are a schematic diagram and block diagrams for illustrating a constitution example of an image forming apparatus (in a case of including an in-line scanner and an in-line colorimeter) according to the present example. FIGS. 9 to 13 are flowcharts illustrating operations of the image forming apparatus (in a case of including an in-line scanner and an in-line colorimeter) according to the present example. FIG. 14 is a schematic diagram illustrating an example of a color chart according to the present example.

As illustrated in FIG. 4, printing system 10 of the present example includes output instruction device 20, profile creation device 30, controller 40, image forming apparatus 50 and colorimeter 60. The above devices are communicably connected to each other via a communication network 70, where examples of the communication network 70 include a LAN (Local Area Network) and WAN (Wide Area Network) defined by specifications, such as Ethernet, Token Ring and FDDI (Fiber-Distributed Data Interface).

Output instruction device 20 is a computing device as a client, and is configured to issue a job to give print instructions to controller 40 through a printer driver or a software program for exclusive use.

Profile creation device 30 is configured to create or correct a profile, like a scanner profile or a printer profile, by using RGB values and colorimetric values obtained by measurement of a color chart output by image forming apparatus 50, and to estimate colorimetric values by using the created or corrected profile. The detailed constitution of the profile creation device 30 will be described later.

Controller 40 is configured to perform image processing, which includes color conversion, screening and rasterizing, on a job issued by the output instruction device 20, and transfer image data obtained after the image processing, to image forming apparatus 50. The above color conversion is performed by using a scanner profile or a printer profile created by the profile creation device 30.

Image forming apparatus 50 is configured to receive image data from controller 40, and form an image based on the image data on paper sheets, to print the image data. The detailed constitution of the forming apparatus 50 will be also described later.

Colorimeter 60 is a color measurement device supporting spectrophotometry (spectrophotometer or spectrocolorimeter) capable of measuring the light intensity at each wavelength. The colorimeter 60 is configured to measure colors of a color chart output from image forming apparatus 50 and to output colorimetric values (for example, L*a*b* values, XYZ values, or other color values in a device-independent color space).

Herein, FIG. 4 illustrates an example construction of printing system 10 of the present example, and its construction can be modified appropriately. For example, printing system 10 may have a construction, as illustrated in FIG. 5, that image forming apparatus includes controller 40. Further, printing system 10 may have a construction that controller 40 or image forming apparatus 50 includes profile creation device 30, or a construction that image forming apparatus 50 includes colorimeter 60. Hereinafter, profile creation device 30 and image forming apparatus 50 will be described in detail.

Profile Creation Device:

As illustrated in FIG. 6A, the profile creation device 30 includes control unit 31, storage unit 35, network interface (I/F) unit 36, display unit 37 and operation unit 38.

Control unit 31 includes a CPU (Central Processing Unit) 32 as a hardware processor, and memories including ROM (Read Only Memory) 33 and RAM (Random Access Memory) 34. CPU 32 reads out control programs stored in ROM 33 or storage unit 35, loads the control programs onto RAM 34, and executes the control programs, thereby performing the whole operations of profile creation device 30.

Storage unit 35 includes a HDD (Hard Disk Drive) and/or a SSD (Solid State Drive). The storage unit 35 stores programs which, when being executed, cause CPU 32 to control various sections of the profile creation device 30; information about operations and functions of the profile creation device 30; a scanner profile having been created or corrected, a correction LUT for correcting a scanner profile, and other data.

The network interface unit 36 includes a NIC (Network Interface Card) and/or a modem. The network interface unit 36 connects the profile creation device 30 to communication network 70 so as to be communicable with controller 40, image forming apparatus 50, and colorimeter 60.

Display unit 37 includes a display, for example, a LCD (Liquid Crystal Display) or an organic EL (Electro-Luminescence) display, so as to display various kinds of screens with regard to creation and correction of a scanner profile.

Operation unit 38 includes a device, for example, a mouse, a keyboard and/or hardware switches, and allows an operator to perform various operations with regard to creation or correction of a scanner profile.

As illustrated in FIG. 6B, the control unit 31 is configured to work as a chart-print instructing section 31a, RGB-value obtaining section 31b, colorimetric-value obtaining section 31c, scanner-profile creating section 31d, correction-amount calculating section 31e and colorimetric-value estimating section 31f.

Chart-print instructing section 31a is configured to give instructions to print a color chart to be used for creating a scanner profile (referred to as a first color chart), to printing unit 59 of image forming apparatus 50 (please see FIG. 8A). At this time, chart-print instructing section 31a arranges at least patches of colors needed for correction of a scanner profile in an area (a common measuring area which will be mentioned later) that is measured with both in-line scanner 59a and in-line colorimeter 59b of the image forming apparatus 50, which will be mentioned later, and sets the size of the patches in the area to a relatively large size (wherein the size is equal to or larger than a minimum measurable size of the in-line colorimeter 59b, and hereinafter, referred to a first size). Herein, the first size may be defined so that the in-line scanner 59a can measure a patch of the first size without an influence of light reflected by patches surrounding the patch to be measured. Chart-print instructing section 31a further arranges patches of colors needed for creating a scanner profile in another area (scanner measuring area which will be mentioned later) that is not measured by the in-line colorimeter 59b and is measured by the in-line scanner 59a, and sets the size of patches in the area to a relatively small size, in other words, a size smaller than the first size (wherein the size is measurable with the in-line scanner 59a, specifically, a size corresponding to each sensor of a line scanner constituting the in-line scanner 59a, and hereinafter, and, referred to as a second size).

Chart-print instructing section 31a is further configured to give instructions to print a color chart to be used for color verification, color correction, creation of a printer profile, or the like (referred to as a second color chart), to printing unit 59 of image forming apparatus 50 (please see FIG. 8A). At this time, chart-print instructing section 31a arranges at least patches of colors needed for correcting a scanner profile (preferably, in the same order of colors of patches as those in the first color chart) in an area (the above-mentioned common measuring area) that is measured by both the in-line scanner 59a and the in-line colorimeter 59b, and sets the size of the patches in the area to the above-mentioned first size. Chart-print instructing section optionally arranges patches of colors needed for color verification, color correction, or creation of a printer profile in another area (the above-mentioned scanner measuring area) that is not measured by the in-line colorimeter 59b and is measured by the in-line scanner 59a, and sets the size of the patches in the area to the above-mentioned second size.

Herein, in the above operations, chart-print instructing section 31a arranges patches of the same size (the first size) in the common measuring area in the first color chart and in the common measuring area in the second color chart. However, the size of patches arranged in the common measuring area may be made different between the first color chart and the second color chart in a range in which in-line scanner 59a can measure a patch without an influence of light reflected from patches surrounding the patch to be measured or with the same degree (the same level of flare) of the influence of the reflected light. Similarly, in the above operations, chart-print instructing section 31a arranges patches of the same size (the second size) in the scanner measuring area in the first color chart and that in the second color chart. However, the size of patches arranged in the scanner measuring area may be made different between the first color chart and the second color chart in a range in which in-line scanner 59a can measure a patch without an influence of light reflected from patches surrounding the patch to be measured or with the same degree (the same level of flare) of the influence of the reflected light.

RGB-value obtaining section 31b is configured to perform the following operations. On creating a scanner profile, RGB-value obtaining section 31b obtains RGB values given by measurement of patches in a color chart (the first color chart) with in-line scanner 59a of image forming apparatus 50. On correcting a seamier profile, carrying out color verification by using a scanner profile, carrying out color correction by using a scanner profile, or creating a printer profile, RGB-value obtaining section 31b obtains RGB values given by measurement of patches (at least in the common measuring area) in a color chart (the second color chart) with in-line scanner 59a of image forming apparatus 50.

Colorimetric-value obtaining section 31c is configured to perform the following operations. On creating a scanner profile, colorimetric-value obtaining section 31c obtains colorimetric values given by measurement of patches in a color chart (the first color chart) with colorimeter 60. On correcting a scanner profile, colorimetric-value obtaining section 31c obtains colorimetric values given by measurement of patches arranged in the common measuring area in a color chart (the second color chart) with in-line colorimeter 59b of image forming apparatus 50.

Scanner-profile creating section 31d is configured to perform the following operations. On creating a scanner profile, scanner-profile creating section 31d creates a scanner profile (to be used for converting RGB values into colorimetric values) in which the RGB values of each patch in the scanner measuring area in the first color chart obtained by RGB-value obtaining section 31b are associated with the colorimetric values of the corresponding patch in the same area in the first color chart obtained by the colorimetric-value obtaining section 31c. Scanner-profile creating section 31d further stores, in the storage section 35, the RGB value of patches in the common measuring area in the first color chart obtained by RGB-value obtaining section 31b and the colorimetric value of patches in the same area in the first color chart obtained by the colorimetric-value obtaining section 31c.

Correction-amount calculating section 31e is configured to perform the following operations. Correction-amount calculating section 31e calculates correction amounts of colorimetric values, to be used for estimation of colorimetric values by using a scanner profile, on the basis of the RGB values and colorimetric values of patches in the common measuring area in the first color chart, which were obtained by RGB-value obtaining section 31b and colorimetric-value obtaining section 31c and were stored on creating the scanner profile, and the RGB values and colorimetric values of patches in the common measuring area in the second color chart, which were obtained by RGB-value obtaining section 31b and colorimetric-value obtaining section 31c on correcting the scanner profile. In concrete terms, correction-amount calculating section 31e uses the RGB values and colorimetric values of patches in the common measuring area in the first color chart which were obtained by RGB-value obtaining section 31b and colorimetric-value obtaining section 31c and were stored on creating the scanner profile, to convert the RGB values of patches in the common measuring area in the second color chart obtained by RGB-value obtaining section 31b into corresponding colorimetric values, thereby estimating the colorimetric values corresponding to the RGB values. Then, correction-amount calculating section 31e obtains the correction amounts on the basis of a difference between the colorimetric values given by the conversion (estimation) and the respective colorimetric values of patches in the common measuring area in the second color chart obtained by colorimetric-value obtaining section 31c, and creates a correction LUT by using the correction amounts. Then, as required, correction-amount calculating section 31e applies the created correction LUT to the scanner profile created by scanner-profile creating section 31d, to correct the scanner profile.

Colorimetric-value estimating section 31f is configured to perform the following operations. Colorimetric-value estimating section 31f uses the scanner profile corrected by correction-amount calculating section 31e to convert the RGB values of patches in the scanner measuring area in the second color chart, obtained by RGB-value obtaining section 31b, into corresponding colorimetric values, thereby estimating colorimetric values corresponding to the RGB values. Alternatively, colorimetric-value estimating section 31*f* uses the scanner profile created by scanner-profile creating section 31*d* to convert the RGB values of patches in the scanner measuring area in the second color chart, obtained by RGB-value obtaining section 31*b*, into corresponding colorimetric values, and corrects the colorimetric values given by the conversion, on the basis of the correction amounts in the correction LUT created by correction-amount calculation section 31*e*, thereby estimating colorimetric values corresponding to the RGB values. For example, colorimetric-value estimating section 31*f* may obtain, from the correction LUT, correction amounts for correcting the colorimetric values given by the conversion, and add the correction amounts to the respective colorimetric values given by the conversion, to estimate the colorimetric values.

Herein, the above-mentioned chart-print instructing section 31*a*, RGB-value obtaining section 31*b*, colorimetric-value obtaining section 31*c*, scanner-profile creating section 31*d*, correction-amount calculating section 31*e* and colorimetric-value estimating section 31*f* may be constituted as hardware devices. Alternatively, the above-mentioned chart-print instructing section 31*a*, RGB-value obtaining section 31*b*, colorimetric-value obtaining section 31*c*, scanner-profile creating section 31*d*, correction-amount calculating section 31*e* and colorimetric-value estimating section 31*f* may be provided by a color-conversion control program which causes the control unit 31 to function as these sections when being executed by CPU 32. That is, the control unit 31 may be configured to serve as the chart-print instructing section 31*a*, RGB-value obtaining section 31*b*, colorimetric-value obtaining section 31*c*, scanner-profile creating section 31*d*, correction-amount calculating section 31*e* and colorimetric-value estimating section. 31*f*, when CPU 32 executes the color-conversion control program.

Image Forming Apparatus:

Image forming apparatus 50 may be a MFP (Multi-Functional Peripheral) or a single-functional printer, and is configured to output a first color chart for creating of a scanner profile and a second color chart for one of color verification, color correction and creation of a printer profile. FIG. 7 illustrates a construction example of image forming apparatus 50, which is equipped with a scanner (in-line scanner 59*a*) and a colorimeter (in-line colorimeter 59*b*). The image forming apparatus 50 includes, as illustrated in FIG. 8A, control unit 51, storage unit 55, network interface (I/F) unit 56, display and operation unit 57, image processing unit 58 and a printing unit 59.

Control unit 51 includes CPU 52 and memories including ROM 53 and RAM 54. CPU 52 reads out control programs stored in ROM 53 or storage unit 55, loads the control programs onto RAM 54, and executes the control programs, thereby performing the whole operations of the image forming apparatus 50.

Storage unit 55 includes a HIM and/or a SSD. Storage unit 55 stores programs which, when being executed, causes CPU 52 to control various sections of the image forming apparatus 50; information about processing and functions of the image forming apparatus 50; scanner profiles, printer profiles, and other data.

Network interface unit 56 includes a NIC and/or a modem. Network interface unit 56 connects image forming apparatus 50 to communication network 70 so as to be communicable with profile creation device 30 and controller 40.

Display and operation unit 57 is configured to display various screens relating to print processing and allows an operator to perform, on the screens, various operations relating to printing. Examples of the display and operation unit 57 include a touch screen in which a pressure-sensitive operation unit (a touch sensor) composed of lattice-shaped transparent electrodes is arranged on a display unit. If image forming apparatus 50 has functions of profile creation device 30, the display and operation unit 57 displays various screens relating to creation and correction of a scanner profile and allows an operator to perform, on the screens, various operations relating to creation or correction of the scanner profile.

Image forming apparatus 50 includes image processing unit 58 in the case where the image forming apparatus 50 has the functions of controller 40. The image processing unit 58 is configured to perform image processing, including color conversion, screening, and rasterization, on a job issued by the output instruction device 20, and transfer image data obtained after the image processing to the printing unit 59.

Printing unit 59 (print engine) is configured to perform printing by using image data obtained after the image processing. In the printing unit 59, an exposure unit performs exposure irradiates a photoreceptor drum, which was charged by a charging unit, with a laser beam in accordance with an image, to form latent images on the photoreceptor drum. A developing unit then develops the latent image by adhering charged toner onto the photoreceptor drum, and the developed toner image is transferred onto a transfer belt (first transfer processing), further is transferred from a transfer belt onto a sheet of paper (second transfer processing), and are fixed onto the sheet by a fixing unit. The printing unit 59 includes in-line scanner 59*a* and in-line colorimeter 59*b*.

In-line scanner 59*a* includes a line sensor in which, for example, three kinds of sensors for RGB colors are arrayed in the main scanning direction, and is configured to output RGB values given by measurement of an original with the RGB sensors. In-line scanner 59*a* is capable of measuring within measurement area 81 (please see thick broken line in FIG. 14) on an original.

In-line colorimeter 59*b* is, for example, a color measurement device supporting spectrophotometry (spectrophotometer or spectrocolorimeter) capable of measuring the light intensity at each wavelength, and is configured to output color measurement values (L*a*b* values, XYZ values, or colorimetric values in a device-independent color space with the accuracy similar to that of an external color measurement device (colorimeter 60). In-line colorimeter 59*b* is capable of measuring within measurement area 82 (please see thick solid line in FIG. 14) on an original, where the measurement area 82 is composed of common measuring area 84 that is measured by both of in-line scanner 59*a* and in-line colorimeter 59*b* and scanner measuring area 83 that is measured by in-line scanner 59*a* and is not measured by in-line color measurement device 59*b*, which will be described below.

In the case where image forming apparatus 50 has the functions of the profile creation device 30, as illustrated in FIG. 89, control unit 51 works as chart-print instructing section 51*a*, RGB-value obtaining section 51*b*, colorimetric-value obtaining section 51*c*, scanner-profile creating section 51*d*, correction-amount calculating section 51*e* and colorimetric-value estimating section 51*f* (or is configured to execute the color-conversion control program to cause the control unit 51 to function as these sections). Descriptions of these sections of the control unit 51 are omitted because they are configured to be similar as those of control unit 31 of profile creation device 30.

It should be noted that FIG. 4 to FIG. 89 illustrate printing system 10 of the present example for illustrative purpose only, and the constitution and control of each device in the printing system 10 may be modified appropriately as far as the printing system 10 can carry out, by using a color chart, creation or correction of a scanner profile, estimation of colorimetric values by using the scanner profile, and carry out other operations such as color correction, color verification and creation of a printer profile, where the a color chart includes patches of the first size arranged in common measuring area 84 and patches of the second size arranged in scanner measuring area 83.

Hereinafter, a description is given to operations of printing system 10 with the above-mentioned constitution. The following flows are described on the basis of image forming apparatus 50 illustrated in FIG. 7 and FIGS. 8A and 8B. That is, the description is given on the presupposition that image forming apparatus 50 has the functions of the profile creation device 30 (that is, control unit 51 of the image forming apparatus 50 works as chart-print instructing section 51a, RGB-value obtaining section 31b, colorimetric-value obtaining section 51c, scanner-profile creating section 51d, correction-amount calculating section 51e and colorimetric-value estimating section 510 and that printing unit 59 of the image forming apparatus 50 includes in-line scanner 59a and in-line color measurement device 59b.

Creation of Scanner Profile:

First, a description is given of creation of a scanner profile. CPU 52 reads out the color-conversion control program stored in ROM 53 or storage unit 55, loads the program onto RAM 54, and executes the program, thereby performing steps of the flowchart in FIG. 9. It may be enough to perform the operations once at the beginning, in other words, to perform the operations once before estimation of colorimetric values which will be described later.

Control unit 51 (chart-print instructing section 51a) creates an image of a color chart for creating a scanner profile (the first color chart). In the color chart, patches of colors which represent the color gamut of image forming apparatus 50 and are located on the outermost edge of the color gamut, and of other colors are arranged so that the color chart can provide information covering the whole color gamut of image forming apparatus 50. On the basis of the image, control unit 51 (chart-print instructing section 51a) then gives printing unit 59 instructions to print the color chart for creating a scanner profile (S101).

FIG. 14 illustrates an example of the color chart for creating a scanner profile. As shown in FIG. 14, in-line scanner 59a is capable of measuring within measurement area 81 (the area indicated with a thick broken line in FIG. 14), and the in-line colorimeter 59b is capable of measuring within measurement area 82 (the area indicated with a thick solid line in FIG. 14). The color chart 80 is divided into an area that is measured only by in-line scanner 59a (scanner measuring area 83, i.e., an area excluding the measurement area 82 of the in-line colorimeter from 59b from the measurement area 81 of the in-line scanner 59a) and an area that is measured by both in-line scanner 59a and in-line colorimeter 59b (common measuring area 84 extending longitudinally at the center of the color chart 80, i.e., the same area as the measurement area 82 of in-line colorimeter 59b). In the common measuring area 84, there are arranged patches of colors needed for correcting a scanner profile, where the colors include, for example, eight colors including pure colors such as Red, Yellow, Green, Cyan, Blue and Magenta, the background color (white) and the most dark spot (400% black), and optionally includes intermediate colors between them. Each of the patches in the common measuring area 84 is shaped in a size (the first size) equal to or larger than the minimum size measurable by the in-line colorimeter 59b. In the scanner measuring area 83, there are arranged patches of colors needed for creating a scanner profile, where the colors includes, for example, the above eight colors and colors prepared by mixing the pure colors while the respective ratios are gradually changed. Each of the patches in the common measuring area 84 is shaped in a size (the second size being smaller than the first size) measurable by the in-line scanner 59a.

Next, control unit 51 (RGB-value obtaining section 51b) obtains RGB values of all the patches in the color chart for creating a scanner profile, obtained by measurement of the color chart with in-line scanner 59a of printing unit 59 (in other words, controls in-line scanner 59a of printing unit 59 to measure the color chart for creating a scanner profile to obtain the RGB values) (S102).

Next, control unit 51 (colorimetric-value obtaining section 51c) obtains the colorimetric value of all the patches in the color chart for creating a scanner profile, obtained by measurement of the color chart with external colorimeter 60 (in other words, controls external colorimeter 60 to measure the color chart for creating a scanner profile to obtain the colorimetric values) (S103).

Next, control unit 51 (scanner-profile creating section 51d) associates the RGB values and colorimetric values of each of the patches in the scanner measuring area 83 in the color chart for creating a scanner profile, thereby creating a scanner profile (S104). Then, control unit 51 (scanner-profile creating section 51d) stores the RGB values and the colorimetric values of the patches in the common measuring area 84 in the color chart for creating a scanner profile, in the storage unit 55 or another storage in printing system 10 (S105).

Estimation of Colorimetric Values:

Next, a description is given of estimation of colorimetric values. CPU 52 reads out the color-conversion control program stored in ROM 53 or storage unit 55, loads the program onto RAM 54, and executes the program, thereby performing steps of the flowcharts in FIGS. 10 to 12.

First, control unit 51 reads the created scanner profile from the storage unit 55 or another storage in printing system 10 (S201). Here, the scanner profile to be read by control unit 51 may be a scanner profile corrected in this flow.

Next, control unit 51 (chart-print instructing section 51a) creates an image of a color chart (the second color chart) for correcting a scanner profile in which plural color patches are arranged. On the basis of the image, control unit 51 (chart-print instructing section 51a) then gives printing unit 59 instructions to print the color chart tier correcting a scanner profile (S202).

The arrangement of patches of this color chart depends on a purpose to obtain colorimetric values by using a scanner profile. The arrangement of patches may be, for example, an arrangement for color calibration to suppresses a fluctuation in color reproduction of a printer, an arrangement tier creating a printer profile (ICC Profile), or an arrangement for color verifications (used for confirming whether colors after color management processing fall within the tolerance of target colors). In the color chart, there are arranged patches at least in the common measuring area 84, where the colors of the patches are those needed for correcting a scanner profile, where the colors include, for example, eight colors including pure colors such as Red, Yellow, Green, Cyan, Blue and Magenta, the background color (white) and the most dark spot (400% black), and optionally includes intermediate colors between them. Each of the patches in the common measuring area 84 in the color chart for correcting a scanner profile is shaped in the same size (the first size) as the patches arranged in the common measuring area 84 in the color chart for creating a scanner profile. The patches in the common measuring area 84 in the color chart for correcting a scanner profile are optionally arranged in the same order of colors as the patches arranged in the common measuring area 84 in the color chart for creating a scanner profile.

Next, control unit 51 (RGB-value obtains section 51*b*) obtains RGB values of all the patches (patches arranged at least in the common measuring area 84) in the color chart for correcting a scanner profile, obtained by measurement of the color chart with in-line scanner 59*a* (in other words, controls in-line scanner 59*a* of printing unit 59 to measure the color chart for correcting a scanner profile, to obtain the RGB values). Then, control unit 51 (RGB-value obtains section 51*b*) stores the obtained RGB values in the storage unit 55 or another storage in printing system 10 (S203).

Next, control unit 51 (colorimetric-value obtaining section 51*c*) obtains the colorimetric values of the patches in common measuring area 84 in the color chart for correcting a scanner profile, obtained by measurement of the color chart with in-line colorimeter 59*b* of printing unit 59 (in other words, controls the in-line colorimeter 59*b* of printing unit 59 to measure the color chart for correcting a scanner profile to obtain the colorimetric values). Then, control unit 51 (colorimetric-value obtaining section 51*c*) stores the obtained colorimetric values in the storage unit 55 or another storage in printing system 10 (S204).

Next, control unit 51 (correction-amount calculating section 51*e*) corrects the scanner profile by using the RGB values and colorimetric value of the patches in the common measuring area 84 in a color chart for creating a scanner profile and the RGB values and colorimetric values of the patches in the common measuring area 84 in the color chart for correcting a scanner profile (S205). The details of this step will be mentioned later.

Next, control unit 51 (colorimetric-value estimating section 51*f*) estimates colorimetric values by converting the RGB values of each of the patches in the scanner measuring area 83 in the color chart for correcting a scanner profile, into corresponding colorimetric values by using the corrected scanner profile (S206). Then, the control unit 51 (colorimetric-value estimating section 510 judges whether the RGB values are converted into corresponding colorimetric values for all the patches in the scanner measuring area 83 in the color chart for correcting a scanner profile (S207), and repeatedly executes the step at S206 until conversion of the RGB values into colorimetric values (in other words, estimation of the colorimetric values) is completed for all the patches in the scanner measuring area 83.

Next, correction of the scanner profile at S205 is described with reference to FIG. 11 and FIG. 12.

First, control unit 51 (correction-amount calculating section 51*e*) creates a correction LUT to be used for correcting the scanner profile (S301). FIG. 12 illustrates the details of this step. First, control unit 51 obtains the RGB values (RGB1) and colorimetric values (COL1) of the patches (patches arranged in the common measuring area 84) in the color chart for creating a scanner profile, from storage unit 55 or another storage in printing system 10 (S401). Next, control unit 51 obtains RGB values (RGB2) and colorimetric values (COL2) of the patches (patches arranged in the common measuring area 84) in the color chart for correcting a scanner profile, from storage section 55 or another storage in printing system 10 (S402). Next, on the basis of the correspondence between RGB1 and COL1, control unit 51 calculates colorimetric values (COL2') corresponding to RGB2 (in other words, converts RGB2 into COL2') to estimate colorimetric values corresponding to RGB2 (S403). Next, control unit 51 calculates correction amounts by subtracting the colorimetric values (COL2') obtained by the conversion or estimation, from the colorimetric values (COL2) obtained at S402 (S404). Then, control unit 51 judges whether calculation of correction amounts has been completed for all the patches arranged in common measuring area 84 in the color chart for correcting a scanner profile (S405). If there is any patch for which a correction amount is not calculated, the operations are made to return to S401, and the same operations are repeated. When the correction amounts have been calculated for all the patches in the common measuring area 84 in the color chart, control unit 51 creates a correction LUT by using the calculated correction amounts (S406).

Figure 11:
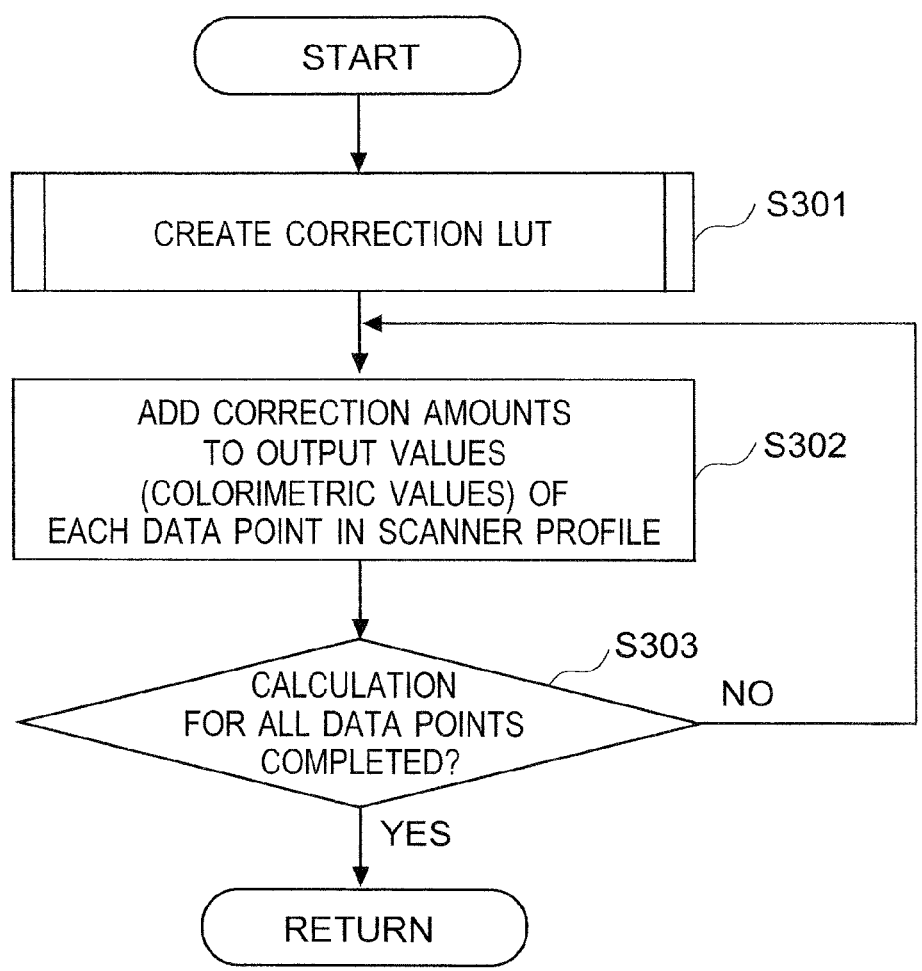
FIG. 11 is a flowchart illustrating an example of operations (correction of a scanner profile) of the image forming apparatus according to one embodiment of the present invention.
Figure 12:
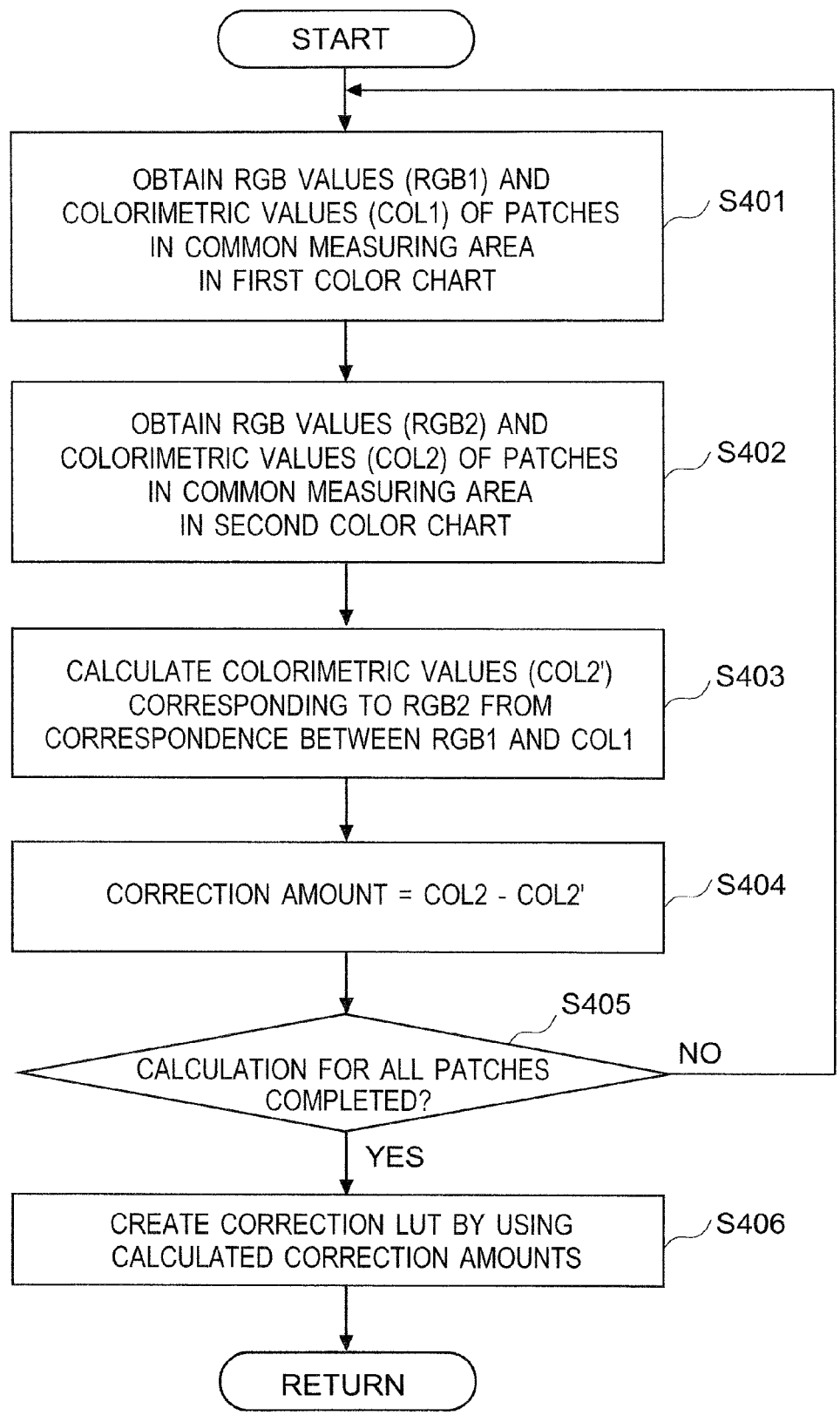
FIG. 12 is a flowchart illustrating an example of operations (creation of a correction LUT) of the image forming apparatus according to one embodiment of the present invention.
Figure 13:
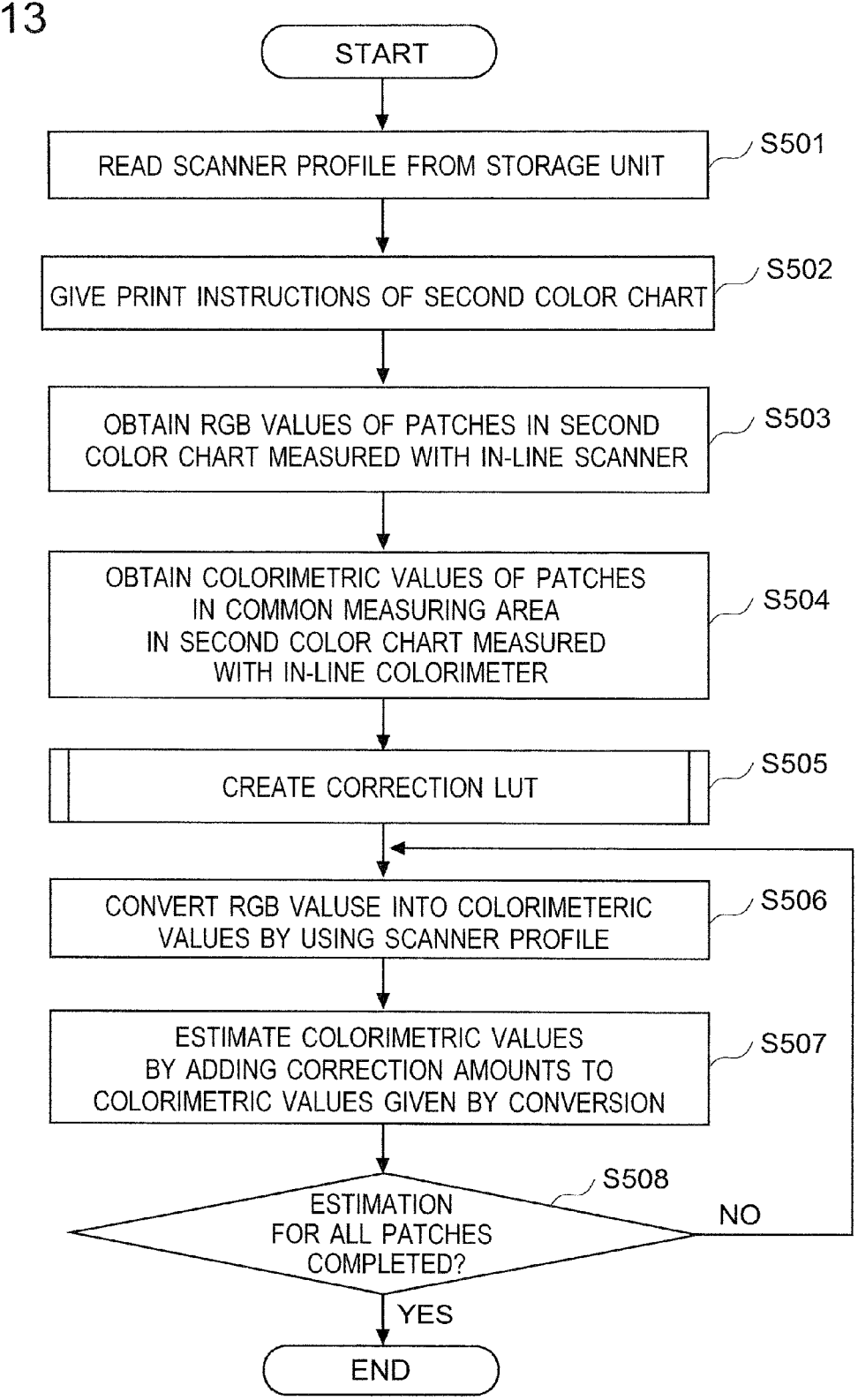
FIG. 13 is a flowchart illustrating another example of operations (estimation of colorimetric values) of an image forming apparatus according to one embodiment of the present invention.

The description returns to FIG. 11. Control unit 51 (correction-amount calculating section 51*e*) corrects the output values (COL1) of data points in the scanner profile on the basis of the correction amounts in the correction LUT (for example, obtains, from the correction LUT, correction amounts for correcting the output values of data points in the scanner profile, and adds the correction amounts to the respective output values) (S302), and repeats this step until the calculation for all data points has been completed (No in S303). When the calculation for all data points has been completed, control unit 51 ends the correction of the scanner profile.

In the above-mentioned flow, colorimetric values are estimated by conversion of the RGB values of the patches in the scanner measuring area 83 in a second color chart for correcting a scanner profile, into colorimetric values, by using the scanner profile corrected by using the correction LUT. Alternatively, the colorimetric values may be estimated without correcting the scanner profile. The estimation of colorimetric values in that case is described below. CPU 52 reads out the color-conversion control program stored in ROM 53 or storage unit 55, loads the program onto RAM 54, and executes the program, thereby performing steps of the flowchart in FIG. 13.

Figure 10:
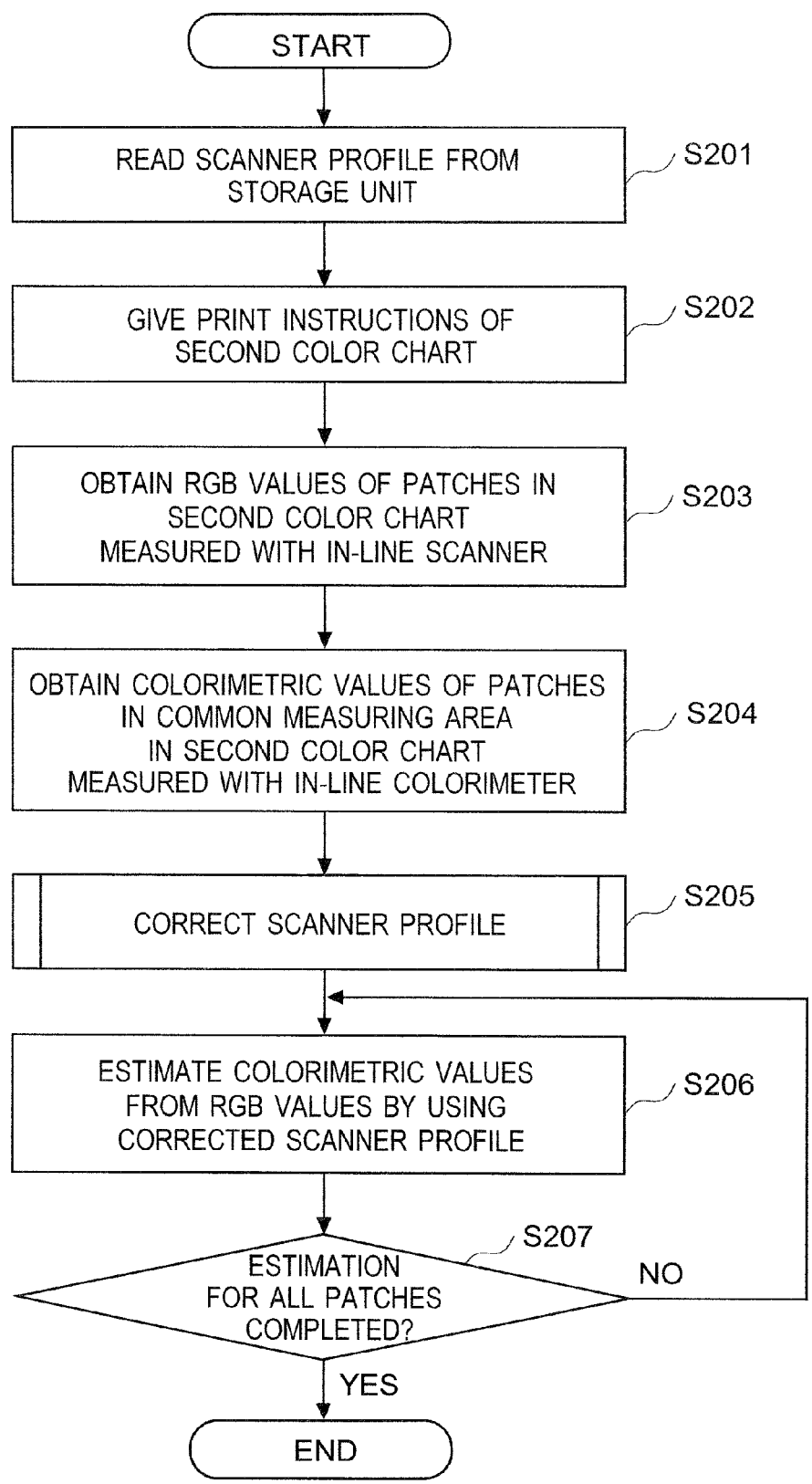
FIG. 10 is a flowchart illustrating an example of operations (estimation of colorimetric values) of the image forming apparatus according to one embodiment of the present invention.

First, similarly to the flowchart shown in FIG. 10, control unit 51 reads the created scanner profile from storage unit 55 or another storage in printing system 10 (S501). Next, control unit 51 (chart-print instructing section 51*a*) creates an image of a color chart (the second color chart) for correcting a scanner profile in which color patches are arranged. On the basis of the image, control unit 51 (chart-print instructing section 51*a*) then gives printing unit 59 instructions to print the color chart for correcting a scanner profile (S502). In the color chart for correcting the scanner profile, similarly to that created in the flow shown in FIG. 10, there are arranged patches at least in the common measuring area 84, and each of the patches in the common measuring area 84 is shaped in the same size (the first size) as the patches arranged in the common measuring area 84 in the color chart for creating the scanner profile. The patches in the common measuring area 84 are optionally arranged in the same order of colors as the patches arranged in the common measuring area 84 in the color chart for creating a scanner profile.

Next, control unit 51 (RGB-value obtains section 51*b*) obtains the RGB values of all the patches (patches arranged at least in the common measuring area 84) in the color chart for correcting a scanner profile, obtained by measurement of the color chart with in-line scanner 59a. Then, control unit 51 (RGB-value obtains section 51b) stores the obtained RGB values in storage unit 55 or another storage in printing system 10 (S503). Next, control unit 51 (colorimetric-value obtaining section 51c) obtains the colorimetric values of patches in common measuring area 84 in the color chart for correcting a scanner profile, obtained by measurement of the color chart with in-line colorimeter 59b of printing unit 59. Then, control unit 51 (colorimetric-value obtaining section 51c) stores the obtained colorimetric values in storage unit 55 or another storage in printing system 10 (S504).

Next, control unit 51 (correction-amount calculating section 51e) creates a correction LUT by using the RGB values and colorimetric value of the patches in common measuring area 84 in the color chart for creating a scanner profile and the RGB values and colorimetric values of the patches in common measuring area 84 in the color chart for correcting a scanner profile (S505). This step is executed in accordance with the above-mentioned flowchart shown in FIG. 12.

Next, control unit 51 (colorimetric-value estimating section 51f) uses the scanner profile read at S501 to convert the RGB values of each of the patches in the scanner measuring area 83 in the color chart for correcting a scanner profile, into corresponding colorimetric values (S206), and corrects the colorimetric values given by the conversion, on the basis of the correction amounts in the correction LUT created at S505 (for example, obtains, from the correction LUT, correction amounts for correcting the colorimetric values given by the conversion, and adding the correction amount to respective the colorimetric values given by the conversion), thereby estimating colorimetric values corresponding to the RGB values (S507). Then, control unit 51 (colorimetric-value estimating section 510 judges whether estimation of the colorimetric values has been completed for all the patches in the scanner measuring area 83 in the color chart for correcting a scanner profile (S508), and repeatedly executes the steps at S506 and S507 until the estimation of the colorimetric values has been completed for all the patches in the scanner measuring area 83 in the color chart.

As described above, an image forming apparatus (or a hardware processor for controlling the image forming apparatus) according to an embodiment of the present invention uses the printing unit of the image forming apparatus to print a color chart for creating a scanner profile (the first color chart) and a color chart for correcting a scanner profile (the second color chart) both including patches of the first size arranged in common measuring area 84. The image forming apparatus (or the hardware processor for controlling the image forming apparatus) uses RGB values and colorimetric values of patches in the common measuring area 84 in the color chart for creating a scanner profile, obtained on creating the seamier profile, and RGB values and colorimetric values of patches in the common measuring area 84 in the color chart for correcting the scanner profile, obtained on correcting the scanner profile, to calculate correction amounts of colorimetric values to be used for estimation of colorimetric values by using the scanner profile. As required, the image forming apparatus (or the hardware processor for controlling the image forming apparatus) creates a correction LUT from the calculated correction amounts and estimates the colorimetric values by using the correction LUT and the scanner profile. Accordingly, color patches can be measured both on creating a scanner profile and on correcting the scanner profile, without being affected by reflected light from the neighboring patches or with the same degree of the influence of the reflected light (the level of flare), whereby colorimetric values can be estimated with accuracy.

Incidentally, the present invention should not be limited to an above-mentioned embodiments and examples, and the constitution and control of the system and each of the devices may be modified appropriately unless the modification deviates from the spirit of the present invention.

For example, in the above-mentioned embodiments and examples, the description has been given to the case where the hardware processor of image forming apparatus 50 performs creation or correction of a scanner profile to estimate colorimetric values. Alternatively, the color-conversion control method according to an embodiment of the present invention can be used similarly even in the case where a hardware processor of the profile creating device 30 or of the controller 40 in printing system 10 controls image forming apparatus 50 (in concrete terms, controls the printing unit, in-line colorimeter and in-line scanner of the apparatus) so as to perform the creation or correction of a scanner profile to estimate colorimetric values.

Moreover, in the above-mentioned embodiments and examples, although L*a*b* values in the CIE 1976 color space are exemplified as colorimetric values, XYZ values in the CIE 1931 color space also may be employed.

Moreover, image forming apparatus 50 may be a CMYK printer or a RGB printer, and furthermore, may be made to an electro-photographic printer, an inkjet printer, an offset printing machine, or the like.

The present invention is applicable to image forming apparatuses each equipped with an in-line scanner and an in-line colorimeter, color-conversion control programs for creating or correcting a scanner profile to estimate colorimetric values, non-transitory computer-readable storage media each storing the color-conversion control program, and color-conversion control methods.

The invention claimed is:

1. An image forming apparatus communicably connected with an external colorimeter, comprising:
    a printing unit configured to print a color chart;
    an in-line colorimeter configured to measure colors in a first area in a color chart to output colorimetric values including L*a*b* values or XYZ values;
    an in-line scanner configured to measure colors in the first area and a second area in a color chart to output RGB values, wherein the first area is an area that is measured by the in-line scanner and the in-line colorimeter and the second area is an area that is measured by the in-line scanner and is not measured by the in-line colorimeter;
    a storage unit; and
    a hardware processor configured to control the printing unit, the in-line colorimeter and the in-line scanner, to perform operations comprising,
        first using the printing unit to print a first color chart prepared by arranging patches of first size in the first area and arranging patches of second size in the second area in the first color chart, the second size being smaller than the first size,
        first obtaining RGB values of all the patches in the first color chart from the in-line scanner and colorimetric values of all the patches in the first color chart from the external colorimeter,
        creating a scanner profile by associating the RGB values and the respective colorimetric values of the patches in the second area in the first color chart,
        storing, in the storage unit, the RGB values and the colorimetric values of the patches in the first area in the first color chart, second using the printing unit to print a second color
chart prepared by arranging at least patches of the
first size in the first area in the second color chart,
second obtaining RGB values of the patches in the first
area in the second color chart from the in-line
scanner and colorimetric values of the patches in the
first area in the second color chart from the in-line
colorimeter, and
calculating correction amounts of colorimetric values,
for use in estimation of colorimetric values by using
the scanner profile, the calculating the correction
amounts being on a basis of the RGB values and the
colorimetric values, stored in the storage unit, of the
patches in the first area in the first color chart, and of
the RGB values and the colorimetric values of the
patches in the first area in the second color chart.

2. The image forming apparatus of claim 1,
wherein the calculating the correction amounts includes,
carrying out first conversion of the RGB values of the
patches in the first area in the second color chart into
corresponding colorimetric values, on a basis of the
RGB values and the colorimetric values, stored in
the storage unit, of the patches in the first area in the
first color chart and
calculating the correction amounts on a basis of differences between the colorimetric values of the patches
in the first area in the second color chart and the
respective colorimetric values given by the first
conversion.

3. The image forming apparatus of claim 2,
wherein the second using the printing unit includes,
arranging patches of the second size in the second area
in the second color chart,
the second obtaining includes obtaining RGB values of
the patches in the second area in the second color chart
from the in-line scanner,
the calculating the correction amounts includes, correcting the scanner profile by using the correction amounts,
and
the operations further comprise, using the corrected scanner profile to carry out second conversion of the RGB
values of the patches in the second area in the second
color chart into corresponding colorimetric values, to
estimate colorimetric values corresponding to the RGB
values used in the second conversion.

4. The image forming apparatus of claim 2,
wherein the second using the printing unit includes,
arranging patches of the second size in the second area
in the second color chart,
the second obtaining includes, obtaining RGB values of
the patches in the second area in the second color chart
from the in-line scanner, and
the operations further comprise,
using the scanner profile to carry out second conversion
of the RGB values of the patches in the second area
in the second color chart into corresponding colorimetric values, and
correcting the colorimetric values given by the second
conversion, by using the correction amounts, to
estimate colorimetric values corresponding to the
RGB values used in the second conversion.

5. The image forming apparatus of claim 1,
wherein each of the first color chart and the second color
chart includes, in the first area, patches of colors which
represent a color gamut of the image forming apparatus
and are located on an outermost edge of the color
gamut.

6. The image forming apparatus of claim 1,
wherein the first color chart and the second color chart are
same in order of colors of the patches in the first area.

7. The image forming apparatus of claim 1,
wherein the first size is defined so that the in-line scanner
can measure a patch of the first size without an influence of light reflected by patches surrounding the patch
of the first size to be measured.

8. A non-transitory computer-readable storage medium
storing a color-conversion control program, the color-conversion control program comprising instructions which,
when executed by a computing device or hardware processor, cause the computing device or hardware processor to
perform operations, the computing device or hardware processor being communicably connected with an external
colorimeter and a storage unit and configured to control
a printing unit configured to print a color chart,
an in-line colorimeter configured to measure colors in a
first area in a color chart to output colorimetric values
including L*a*b* values or XYZ values, and
an in-line scanner configured to measure colors in the first
area and a second area in a color chart to output RGB
values, wherein the first area is an area that is measured
by the in-line scanner and the in-line colorimeter, and
the second area is an area that is measured by the in-line
scanner and is not measured by the in-line colorimeter,
the operations comprising:
first using the printing unit to print a first color chart
prepared by arranging patches of first size in the first
area and arranging patches of second size in the
second area in the first color chart, the second size
being smaller than the first size;
first obtaining RGB values of all the patches in the first
color chart from the in-line scanner and colorimetric
values of all the patches in the first color chart from
the external colorimeter;
creating a scanner profile by associating the RGB
values and the respective colorimetric values of the
patches in the second area in the first color chart;
storing, in the storage unit, the RGB values and the
colorimetric values of the patches in the first area in
the first color chart;
second using the printing unit to print a second color
chart prepared by arranging at least patches of the
first size in the first area in the second color chart;
second obtaining RGB values of the patches in the first
area in the second color chart from the in-line
scanner and colorimetric values of the patches in the
first area in the second color chart from the in-line
colorimeter; and
calculating correction amounts of colorimetric values,
for use in estimation of colorimetric values by using
the scanner profile, the calculating the correction
amounts being on a basis of the RGB values and the
colorimetric values, stored in the storage unit, of the
patches in the first area in the first color chart, and of
the RGB values and the colorimetric values of the
patches in the first area in the second color chart.

9. The non-transitory computer-readable storage medium
of claim 8,
wherein the calculating the correction amounts includes,
carrying out first conversion of the RGB values of the
patches in the first area in the second color chart into
corresponding colorimetric values, on a basis of the
RGB values and the colorimetric values, stored in
the storage unit, of the patches in the first area in the
first color chart and calculating the correction amounts on a basis of differences between the colorimetric values of the patches in the first area in the second color chart and the respective colorimetric values given by the first conversion.

10. The non-transitory computer-readable storage medium of claim 9,
wherein the second using the printing unit includes, arranging patches of the second size in the second area in the second color chart,
the second obtaining includes, obtaining RGB values of the patches in the second area in the second color chart from the in-line seamier,
the calculating the correction amounts includes, correcting the scanner profile by using the correction amounts, and
the operations further comprise using the corrected scanner profile to carry out second conversion of the RGB values of the patches in the second area in the second color chart into corresponding colorimetric values, to estimate colorimetric values corresponding to the RGB values used in the second conversion.

11. The non-transitory computer-readable storage medium of claim 9,
wherein the second using the printing unit includes, arranging patches of the second size in the second area in the second color chart,
the second obtaining includes, obtaining RGB values of the patches in the second area in the second color chart from the in-line scanner, and
the operations further comprise
using the seamier profile to carry out second conversion of the RGB values of the patches in the second area in the second color chart into corresponding colorimetric values, and
correcting the colorimetric values given by the second conversion, by using the correction amounts, to estimate colorimetric values corresponding to the RGB values used in the second conversion.

12. The non-transitory computer-readable storage medium of claim 8,
wherein the first using the printing unit includes, arranging, in the first area in the first color chart, patches of colors which represent a color gamut of the image forming apparatus and are located on an outermost edge of the color gamut, and
the second using the printing unit includes, arranging, in the first area in the second color chart, patches of colors which represent the color gamut of the image forming apparatus and are located on the outermost edge of the color gamut.

13. The non-transitory computer-readable storage medium of claim 8,
wherein the first color chart and the second color chart are same in order of colors of the patches arranged in the first area.

14. The non-transitory computer-readable storage medium of claim 8,
wherein the first size is defined so that the in-line scanner can measure a patch of the first size without an influence of light reflected by patches surrounding the patch of the first size to be measured.

15. A color-conversion control method for use in a printing system including an image forming apparatus, a storage unit, an external colorimeter and a hardware processor, the image forming apparatus being equipped with
a printing unit configured to print a color chart,
an in-line colorimeter configured to measure colors in a first area in a color chart to output colorimetric values including L*a*b* values or XYZ values, and
an in-line scanner configured to measure colors in the first area and a second area in a color chart to output RGB values, wherein the first area is an area that is measured by the in-line scanner and the in-line colorimeter and the second area is an area that is measured by the in-line scanner and is not measured by the in-line colorimeter,
the hardware processor being configured to control the printing unit, the in-line colorimeter and the in-line scanner,
the method comprising:
first using, by the hardware processor, the printing unit to print a first color chart prepared by arranging patches of first size in the first area and arranging patches of second size in the second area in the first color chart, the second size being smaller than the first size;
first obtaining, by the hardware processor, RGB values of all the patches in the first color chart from the in-line scanner and colorimetric values of all the patches in the first color chart from the external colorimeter;
creating, by the hardware processor, a scanner profile by associating the RGB values and the respective colorimetric values of the patches in the second area in the first color chart;
storing, by the hardware processor, in the storage unit, the RGB values and the colorimetric values of the patches in the first area in the first color chart;
second using, by the hardware processor, the printing unit to print a second color chart prepared by arranging at least patches of the first size in the first area in the second color chart;
second obtaining, by the hardware processor, RGB values of the patches in the first area in the second color chart from the in-line scanner and colorimetric values of the patches in the first area in the second color chart from the in-line colorimeter; and
calculating, by the hardware processor, correction amounts of colorimetric values, for use in estimation of colorimetric values by using the scanner profile, the calculating the correction amounts being on a basis of the RGB values and the colorimetric values, stored in the storage unit, of the patches in the first area in the first color chart, and of the RGB values and the colorimetric values of the patches in the first area in the second color chart.

16. The method of claim 15,
wherein the calculating the correction amounts includes,
carrying out first conversion of the RGB values of the patches in the first area in the second color chart into corresponding colorimetric values, on a basis of the RGB values and the colorimetric values, stored in the storage unit, of the patches in the first area in the first color chart and
calculating the correction amounts on a basis of differences between the colorimetric values of the patches in the first area in the second color chart and the respective colorimetric values given by the first conversion.

17. The method of claim 16,
wherein the second using the printing unit includes,
arranging patches of the second size in the second area in the second color chart, the second obtaining includes, obtaining RGB values of the patches in the second area in the second color chart from the in-line scanner, the calculating the correction amounts includes, correcting the scanner profile by using the correction amounts, and the method further comprises using, by the hardware processor, the corrected scanner profile to carry out second conversion of the RGB values of the patches in the second area in the second color chart into corresponding colorimetric values, to estimate colorimetric values corresponding to the RGB values used in the second conversion.

18. The method of claim 16, wherein the second using the printing unit includes, arranging patches of the second size in the second area in the second color chart, the second obtaining includes, obtaining RGB values of the patches in the second area in the second color chart from the in-line scanner, and the method further comprises
using, by the hardware processor, the scanner profile to carry out second conversion of the RGB values of the patches in the second area in the second color chart into corresponding colorimetric values, and correcting, by the hardware processor, the colorimetric values given by the second conversion, by using the correction amounts, to estimate colorimetric values corresponding to the RGB values used in the second conversion.

19. The method of claim 15, wherein the first using the printing unit includes, arranging, in the first area in the first color chart, patches of colors which represent a color gamut of the image forming apparatus and are located on an outermost edge of the color gamut, and the second using the printing unit includes, arranging, in the first area in the second color chart, patches of colors which represent the color gamut of the image forming apparatus and are located on the outermost edge of the color gamut.

20. The method of claim 15, wherein the first color chart and the second color chart are same in order of colors of the patches arranged in the first area.

21. The method of claim 15, wherein the first size is defined so that the in-line scanner can measure a patch of the first size without an influence of light reflected by patches surrounding the patch of the first size to be measured.

* * * * *